(12) United States Patent
Chong et al.

(10) Patent No.: US 12,271,401 B2
(45) Date of Patent: Apr. 8, 2025

(54) FRICTION REDUCTION DURING PROFESSIONAL NETWORK EXPANSION

(71) Applicant: Microsoft Technology Licensing, LLC, Redmond, WA (US)

(72) Inventors: Choo Yei Chong, Redmond, WA (US); Heidi Kenyon, Bellingham, WA (US); Neha Parikh Shah, Glen Ridge, NJ (US); Deepa Shenvi Priolkar, Redmond, WA (US); Christopher Michael Dollar, Renton, WA (US); Jin Young Kim, Seattle, WA (US); Aaron Nash Melhaff, Seattle, WA (US); Venkata Sreekanth Kannepalli, Redmond, WA (US); Wende E. Copfer, Woodinville, WA (US); Harald Becker, Seattle, WA (US); Amy L. Huang, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/900,009

(22) Filed: Aug. 31, 2022

(65) Prior Publication Data

US 2024/0070172 A1    Feb. 29, 2024

(51) Int. Cl.
*G06F 16/00*     (2019.01)
*G06F 3/0482*    (2013.01)
(Continued)

(52) U.S. Cl.
CPC .......... *G06F 16/288* (2019.01); *G06F 3/0482* (2013.01); *G06F 9/451* (2018.02); *G06Q 50/01* (2013.01)

(58) Field of Classification Search
CPC ............ G06F 16/908; G06F 16/24578; G06F 16/211; G06F 16/244; G06F 16/248;
(Continued)

(56) References Cited

U.S. PATENT DOCUMENTS 7,856,449 B1  12/2010 Martino et al.
8,400,944 B2   3/2013 Robinson et al.
(Continued)

FOREIGN PATENT DOCUMENTS

IN   2014CH01784 A   10/2015

OTHER PUBLICATIONS

"Final Office Action Issued in U.S. Appl. No. 17/227,809", Mailed Date: Apr. 6, 2023, 36 Pages.
(Continued)

*Primary Examiner* — Vincent F Boccio
(74) *Attorney, Agent, or Firm* — Foley IP Law, PLLC

(57) ABSTRACT

A method for friction reduction during professional network expansion is implemented via a computing system including a processor. The method includes executing, via a network, an enterprise application on a remote computing system operated by a user associated with an enterprise and surfacing a professional networking UI on a display of the remote computing system during execution of the enterprise application. The method includes generating parameters that are representative of a connection between the user and each suggested professional contact based on enterprise-level data corresponding to the user and each suggested professional contact and generating friction-reducing UI elements for each suggested professional contact based on the generated parameters. The method includes receiving, via the professional networking UI, user input including a command to open a contact connection page corresponding to one of the suggested professional contacts and surfacing the
(Continued)

corresponding contact connection page including the generated friction-reducing UI elements.

20 Claims, 14 Drawing Sheets

(51) Int. Cl.
   *G06F 9/451* (2018.01)
   *G06F 16/28* (2019.01)
   *G06Q 50/00* (2012.01)
(58) Field of Classification Search
   CPC .. G06F 16/287; G06F 16/26; G06F 16/24573; G06F 16/95; G06F 40/56; G06F 40/20; G06F 40/18; G06N 7/00; G06N 20/00
   USPC .......................................................... 707/736
   See application file for complete search history.

(56) References Cited

U.S. PATENT DOCUMENTS

| | | | |
|---|---|---|---|
| 8,738,634 | B1 | 5/2014 | Horn et al. |
| 9,860,280 | B1 | 1/2018 | Arquero et al. |
| 10,402,750 | B2 | 9/2019 | Weston et al. |
| 10,491,557 | B1 | 11/2019 | Lee et al. |
| 2002/0055864 | A1 | 5/2002 | Cardwell et al. |
| 2012/0282576 | A1 | 11/2012 | Chenoweth |
| 2013/0159100 | A1 | 6/2013 | Raina et al. |
| 2014/0214936 | A1 | 7/2014 | Abraham et al. |
| 2014/0298204 | A1 | 10/2014 | Jayaram |
| 2014/0351259 | A1 | 11/2014 | Bilimoria et al. |
| 2014/0358826 | A1 | 12/2014 | Traupman |
| 2015/0178658 | A1 | 6/2015 | Baur et al. |
| 2015/0205785 | A1 | 7/2015 | Beckwith et al. |
| 2015/0332201 | A1 | 11/2015 | Bernaudin et al. |
| 2015/0373049 | A1 | 12/2015 | Sharma et al. |
| 2016/0094684 | A1 | 3/2016 | Pic |
| 2016/0132608 | A1* | 5/2016 | Rathod ................... H04W 4/21 707/722 |
| 2016/0191446 | A1 | 6/2016 | Grol-prokopczyk et al. |
| 2016/0358214 | A1 | 12/2016 | Shalunov et al. |
| 2016/0379516 | A1 | 12/2016 | Martinez |
| 2017/0012927 | A1* | 1/2017 | Wollan Fan ............ H04L 67/02 |
| 2017/0076244 | A1 | 3/2017 | Bastide |
| 2017/0132569 | A1 | 5/2017 | Parhi et al. |
| 2017/0193390 | A1 | 7/2017 | Weston et al. |
| 2018/0091467 | A1* | 3/2018 | Andrianakou .......... H04L 51/52 |
| 2018/0268317 | A1 | 9/2018 | Dharwadker et al. |
| 2018/0285774 | A1 | 10/2018 | Soni et al. |
| 2018/0300818 | A1 | 10/2018 | Kabdebon |
| 2019/0114373 | A1 | 4/2019 | Subbian et al. |
| 2019/0188325 | A1 | 6/2019 | Zhao et al. |
| 2019/0188648 | A1 | 6/2019 | Ruiz et al. |
| 2019/0318318 | A1 | 10/2019 | Sergott |
| 2019/0370669 | A1 | 12/2019 | Pais |
| 2020/0004888 | A1 | 1/2020 | Rossi et al. |
| 2020/0104028 | A1* | 4/2020 | Vats ................... G06F 3/04845 |
| 2020/0143427 | A1 | 5/2020 | Hailpern et al. |
| 2020/0372075 | A1 | 11/2020 | Rogynskyy et al. |
| 2021/0097071 | A1 | 4/2021 | Carroll |
| 2021/0103879 | A1 | 4/2021 | Hoch et al. |
| 2021/0224488 | A1 | 7/2021 | Arya et al. |
| 2021/0264372 | A1 | 8/2021 | Asseer et al. |
| 2022/0327637 | A1 | 10/2022 | Shah et al. |
| 2024/0070172 | A1* | 2/2024 | Chong .................. G06Q 10/10 |
| 2024/0070616 | A1 | 2/2024 | Chong |
| 2024/0070790 | A1 | 2/2024 | Chong |

OTHER PUBLICATIONS

Bruun, et al., "Graph-based Recommendation for Sparse and Heterogeneous User Interactions", In Repository of arXiv:2301.11009v1, Jan. 26, 2023, pp. 1-18.

Kim, et al., "Friend Recommendation Using Offline and Online Social Information for Face-To-Face Interactions", In Proceedings of IEEE International Conference on Smart Computing, May 18, 2016, 5 Pages.

Lidstrom, et al., "A Method for Providing Content and Service Recommendations Using Social Information from Telecommunications Networks", In Proceedings of IEEE 12th International Conference on Mobile Data Management, vol. 1, Jun. 6, 2011, pp. 321-328.

"Non Final Office Action Issued in U.S. Appl. No. 17/227,809", Mailed Date: Sep. 13, 2023, 43 Pages.

Frolov, et al., "Tensor Methods and Recommender Systems", In Repository of arXiv:1603.06038v2, Feb. 18, 2018, 42 Pages.

Hannech, et al., "Cold-Start Recommendation Strategy based on Social Graphs", In Proceedings of 7th Annual Information Technology, Electronics and Mobile Communication Conference, Oct. 13, 2016, 7 Pages.

"Analyze Contacts with the Contact Analytics Tool", Retrieved from: https://knowledge.hubspot.com/reports/analyze-contacts-with-the-contact-analytics-tool, Dec. 14, 2020, 6 Pages.

"Datapine", Retrieved from: https://web.archive.org/web/20220616074546/https://www.datapine.com/dashboard-examples-and-templates/, Jun. 16, 2022, 10 Pages.

"QLIK", Retrieved from: https://web.archive.org/web/20220712051810/https://www.qlik.com/us/, Jul. 12, 2022, 5 Pages.

Morgante, Margaux, "7 Ways You Should Measure Your Workplace Culture", Retrieved from: https://www.kudos.com/blog/7-ways-you-should-measure-your-workplace-culture, Jul. 7, 2021, 11 Pages.

"International Search Report and Written Opinion Issued in PCT Application No. PCT/US23/027699", Mailed Date: Oct. 5, 2023, 11 Pages.

"Nylon", Retrieved from: https://web.archive.org/web/20210616195451/https://www.nylon.com/articles/shapr-networking-app, Jun. 16, 2021, 3 Pages.

Leo, Jen, "The Plane app is a way for travelers to make social connections", Retrieved from: https://www.latimes.com/travel/deals/la-tr-0327-webbuzz-20160327-story.html, Mar. 27, 2016, 7 Pages.

Shin, et al., "BlahBlahBot: Facilitating Conversation between Strangers using a Chatbot with ML-infused Personalized Topic Suggestion", Retrieved from: https://k-soomin.github.io/paper/chi2021_blahblahbot_poster.pdf, May 8, 2021, 6 Pages.

Weir, Melanie, "What is Bumble Bizz? How to use the dating app's professional networking mode to make new connections", Retrieved from: https://www.businessinsider.in/tech/how-to/what-is-bumble-bizz-how-to-use-the-dating-apps-professional-networking-mode-to-make-new-connections/articleshow/81478075.cms, Mar. 13, 2021, 16 Pages.

Neha Parikh Shah et al., "Interaction Based Social Distance Quantification", Application Filed Apr. 12, 2021, U.S. Appl. No. 17/227,809, 29 pages.

"LOU", Retrieved from: https://web.archive.org/web/20220613162603/https://www.louassist.com/product/user-onboarding, Jun. 13, 2022, 4 Pages.

"Onboarding a New Hire", Retrieved from: https://help.hcltechsw.com/connections/v65/user/activities/c_onboard_new_hire.html, Retrieved Date: May 16, 2022, 1 Page.

"Roots", Retrieved from: https://web.archive.org/web/20220709032946/https://roots.io/, Jul. 9, 2022, 4 Pages.

"Non Final Office Action Issued in U.S. Appl. No. 17/227,809", Mailed Date: Nov. 18, 2022, 27 Pages.

Badshah, et al., "Onboarding—the Strategic Tool of Corporate Governance for Organizational Growth", In European Journal of Social Sciences, vol. 59, Issue 3, May 2020, pp. 319-326.

Buchan, et al., "Effective Team Onboarding in Agile Software Development: Techniques and Goals", In Proceedings of ACM/IEEE International Symposium on Empirical Software Engineering and Measurement, Oct. 17, 2019, 11 Pages.

Catanese, et al., "Extraction and Analysis of Facebook Friendship Relations", In Computational Social Networks: Mining and Visualization, Jun. 2012, 33 Pages.

Dey, et al., "Email Analytics for Activity Management and Insight Discovery", In Proceedings of the IEEEIWIC/ACM International

(56) References Cited

OTHER PUBLICATIONS

Joint Conferences on Web Intelligence and Intelligent Agent Technologies, Nov. 17, 2013, pp. 557-564.
Forrington, Vince, "How to Use Your Employee Platform to Successfully Onboard New Hires", Retrieved from: https://web.archive.org/web/20210923084104/https://blog.jostle.me/blog/employee-platform-to-successfully-onboard-new-hires, Sep. 23, 2021, 6 Pages.
Joseph, et al., "Effective Onboarding as a Talent Management Tool for Employee Retention", In International Journal in Management & Social Science, vol. 3, Issue 7, Jul. 2015, pp. 175-186.
Mo, et al., "Identifying Users' Interest Similarity Based on Clustering Hot Vertices in Social Networks", In Proceeding of Asia-Pacific Services Computing Conference, Dec. 4, 2014, pp. 170-176.
"International Search Report and Written Opinion Issued in PCT Application No. PCT/US22/021237", Mailed Date: Jul. 1, 2022, 10 Pages.
Svigruha, Gergely, "How Analysing the Social Network of Emails Can Unravel Corporate Structure", Retrieved from: https://www.linkedin.com/pulse/how-analysing-social-network-emails-can-unravel-gergely-svigruha/, Mar. 29, 2017, 3 Pages.
Non-Final Office Action mailed on Jun. 12, 2024, in U.S. Appl. No. 17/900,093, 62 pages.
"Evaluate performance with LinkedIn analytics tools", Octopus, Rederived From internet URL:—https://web.archive.org/web/20210910180904/https://octopuscrm.io/LinkedIn-analytics-tools/, Sep. 10, 2021, 03 Pages.
Groot, De Michael, "View Your Own Connections on LinkedIn", YouTube, Video Link:—https://www.youtube.com/watchv=6WgX0vgRcKU, Mar. 29, 2013, 01 Pages.
Non-Final Office Action mailed on Sep. 18, 2024, in U.S. Appl. No. 17/899,949, 42 pages.
Final Office Action mailed on Nov. 19, 2024, in U.S. Appl. No. 17/900,093, 62 pages.

\* cited by examiner

FRICTION REDUCTION DURING PROFESSIONAL NETWORK EXPANSION

BACKGROUND

The present disclosure relates to professional networking. In particular, the present disclosure relates to techniques for data-driven professional network expansion.

SUMMARY

The following presents a simplified summary in order to provide a basic understanding of some aspects described herein. This summary is not an extensive overview of the claimed subject matter. This summary is not intended to identify key or critical elements of the claimed subject matter nor delineate the scope of the claimed subject matter. This summary's sole purpose is to present some concepts of the claimed subject matter in a simplified form as a prelude to the more detailed description that is presented later.

In an embodiment described herein, a method for friction reduction during professional network expansion is described. The method is implemented via a computing system including a processor. The method includes executing, via a network, an enterprise application on a remote computing system operated by a user associated with an enterprise and causing surfacing of a professional networking user interface (UI) on a display of the remote computing system during the execution of the enterprise application, where the professional networking UI includes UI elements corresponding to a professional network of the user and suggested professional contacts for the user. The method also includes generating parameters that are representative of a connection between the user and each suggested professional contact based on enterprise-level data corresponding to the user and each suggested professional contact and generating friction-reducing UI elements for each suggested professional contact based on the generated parameters. The method further includes receiving, via the professional networking UI, user input including a command to open a contact connection page corresponding to one of the suggested professional contacts, as well as causing surfacing of the contact connection page for the suggested professional contact on the display of the remote computing system, where the contact connection page includes at least a portion of the generated friction-reducing UI elements.

In another embodiment, a computer-readable storage medium is described. The computer-readable storage medium includes computer-executable instructions that, when executed by a processor, cause the processor to execute an enterprise application on a computing system operated by a user associated with an enterprise and to cause surfacing of a professional networking UI on a display of the computing system during the execution of the enterprise application, where the professional networking UI includes UI elements corresponding to a professional network of the user and suggested professional contacts for the user. The computer-readable storage medium also includes computer-executable instructions that, when executed by the processor, cause the processor to generate parameters that are representative of a connection between the user and each suggested professional contact based on enterprise-level data corresponding to the user and each suggested professional contact and to generate friction-reducing UI elements for each suggested professional contact based on the generated parameters. The computer-readable storage medium further includes computer-executable instructions that, when executed by the processor, cause the processor to receive, via the professional networking UI, user input including a command to open a contact connection page corresponding to one of the suggested professional contacts and to cause surfacing of the contact connection page for the suggested professional contact on the display of the computing system, where the contact connection page includes at least a portion of the generated friction-reducing UI elements.

In another embodiment, an application service provider server is described. The application service provider server includes a processor, an enterprise application that is utilized by an enterprise, and a communication connection for connecting a remote computing system to the application service provider server via a network, where the remote computing system is operated by a user associated with an enterprise. The application service provider server also includes a computer-readable storage medium operatively coupled to the processor. The computer-readable storage medium includes computer-executable instructions that, when executed by the processor, cause the processor to execute, via the network, an enterprise application on the remote computing system and to cause surfacing of a professional networking UI on a display of the remote computing system during the execution of the enterprise application, where the professional networking UI includes UI elements corresponding to a professional network of the user and suggested professional contacts for the user. The computer-readable storage medium also includes computer-executable instructions that, when executed by the processor, cause the processor to generate parameters that are representative of a connection between the user and each suggested professional contact based on enterprise-level data corresponding to the user and each suggested professional contact and to generate friction-reducing UI elements for each suggested professional contact based on the generated parameters. The computer-readable storage medium also includes computer-executable instructions that, when executed by the processor, cause the processor to receive, via the professional networking UI, user input including a command to open a contact connection page corresponding to one of the suggested professional contacts and to cause surfacing of the contact connection page for the suggested professional contact on the display of the remote computing system, where the contact connection page includes at least a portion of the generated friction-reducing UI elements. The computer-readable storage medium further includes computer-executable instructions that, when executed by the processor, cause the processor to receive, via the contact connection page, additional user input including an interaction with one of the friction-reducing UI elements and to perform an action corresponding to the selected friction-reducing UI element.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

BRIEF DESCRIPTION OF THE DRAWINGS

The following detailed description may be better understood by referencing the accompanying drawings, which contain specific examples of numerous features of the disclosed subject matter.

FIG. 7 is a schematic view showing an exemplary implementation in which a dashboard of a professional networking UI is surfaced with respect to a professional network expansion feature of an enterprise application;

FIG. 10B is a schematic view showing an exemplary implementation in which a new event box is surfaced on top of the contact connection page of FIG. 10A; and FIG. 10C is a schematic view showing an exemplary implementation in which a message box is surfaced on top of the contact connection page of FIGS. 10A and 10B.

DETAILED DESCRIPTION

Figure 1:
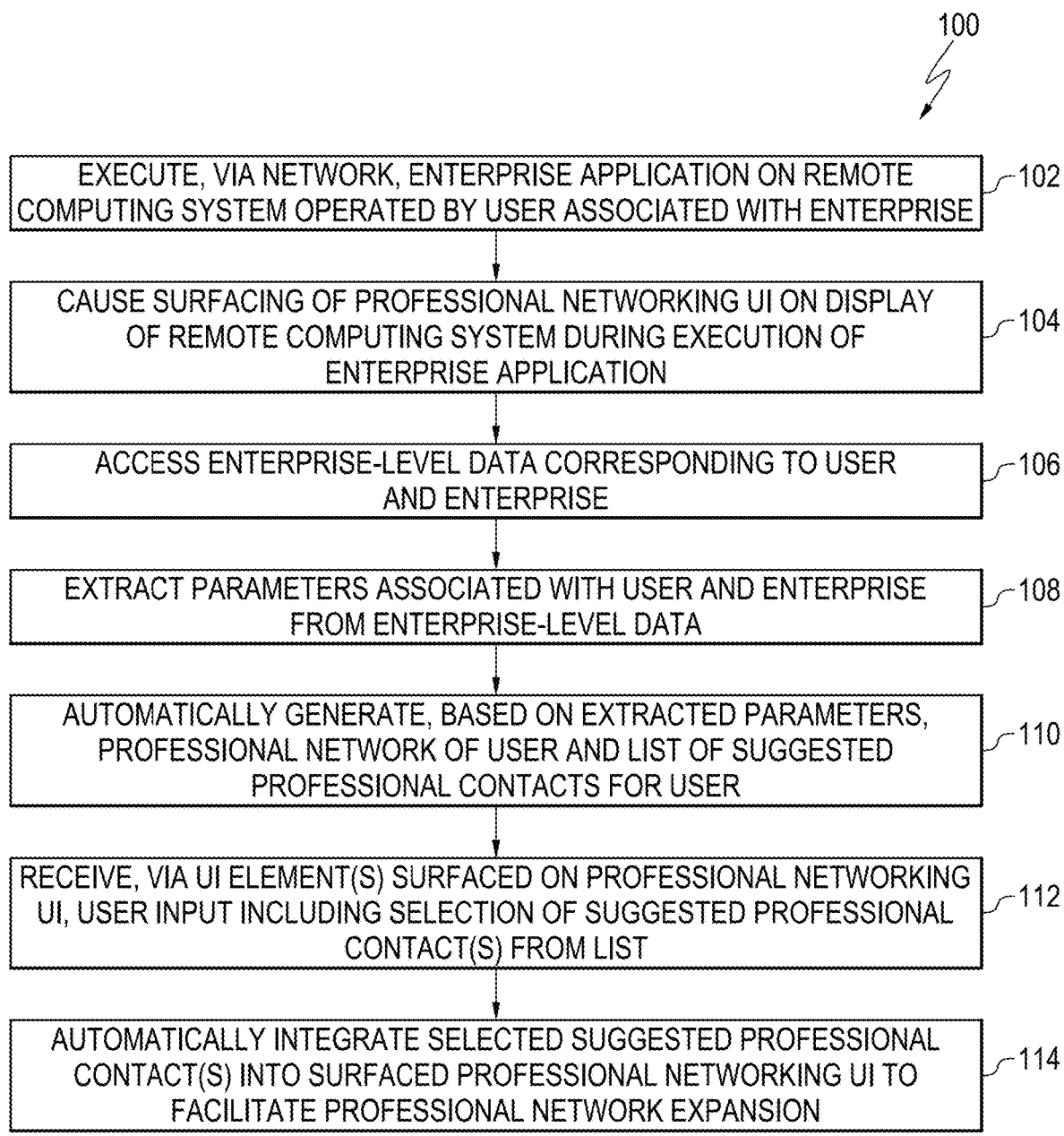
FIG. 1 is a process flow diagram of a method for automatic contact suggestion for professional network expansion according to embodiments described herein.

Professional networking is important for achieving success at work, particularly with regard to overall work impact and potential promotion opportunities. Moreover, in today's environment, technology is the primary means for professional networking. Unfortunately, however, conventional productivity and communication tools do not have functionality dedicated to guide and specifically enable users on developing, maintaining, and expanding their professional networks. Therefore, the present techniques address these and other issues by providing data-driven professional network expansion techniques that provide users with analytics and suggested concrete actions for developing, maintaining, and expanding their professional networks. In particular, the present techniques may be broken down into three aspects.

The first aspect includes techniques for identifying and suggesting professional contacts that would expand users' professional networks to optimize for professional diversity as well as to accommodate users' current and anticipated professional intentions or goals. This may be accomplished, at least in part, by utilizing various parameters associated with a particular user to identify and suggest professional contacts that would expand the user's professional network. In various embodiments, the parameters are determined, at least in part, using enterprise-level data. Such enterprise-level data may include data related to users associated with a particular enterprise. In addition, such enterprise-level data may include data related to enterprise goals and standards, as well as data representing the overall professional diversity of the professional network for the enterprise, including the number and strengths of connections (and connection types) between users and/or the number and strengths of connections (and connection types) between users and entities, including internal entities (e.g., groups within the enterprise) and/or external entities (e.g., customers).

In practice, the types of parameters utilized will depend, at least in part, on the goals of the particular user and/or the type of enterprise with which the user is associated. As one example, if the enterprise is a consulting firm, exemplary parameters may include data related to, for example, service lines (e.g. consultant, assurance, audit, tax, etc.), sub service lines (e.g., technology consulting, security consulting, etc.), geography (e.g., general location of enterprise), region (e.g., specific office locations), seniority (e.g., staff, senior, manager, partner, etc.), tenure term (e.g., 10 years), current engagements/customers, and/or past engagements/customers.

According to embodiments described herein, the data-driven professional network expansion system then utilizes the extracted parameters to provide professional networking-related services to the user, including by identifying and suggesting professional contacts for expanding the user's professional network. Furthermore, machine learning techniques are utilized, optionally in combination with heuristics, to optimize the user's professional network by suggesting professional contacts that align with the particular goals and/or characteristics of the user and/or the associated enterprise. For example, such machine learning techniques may be used to identify and suggest professional contacts who are similar to the user (e.g., to foster mentoring opportunities and/or goal-oriented career growth), as well as professional contacts who are dissimilar to the user (e.g., to foster professional diversity). As a more specific example, early in the user's career, the system may be weighted towards suggesting professional contacts who are more similar to the user, e.g., to help the user establish a network of peers. This may also include suggesting professional contacts who are similar to the user but are further along in their career, e.g., to help the user receive guidance regarding career progression. Toward the middle of the user's career, the system may be weighted towards slowly increasing the professional diversity of the user's professional network. This may be accomplished, at least in part, by aggregating enterprise-level data for similar users to help guide the suggested professional diversity mix. Finally, later in the user's career, the system may be weighted towards identifying and suggesting professional contacts who are early in their career and similar to the user, e.g., to provide the user with an opportunity to mentor other similar professionals.

In various embodiments, the data-driven professional network expansion system provides the suggested professional contacts (and/or other professional networking-related services) to the user through one or more interactive visualizations surfaced via a professional network user interface. In particular, the professional network UI may surface one or more of various visualization types. As an example, a diversity view may be surfaced to provide a visualization of the current and/or projected professional diversity of the user's professional network. Additionally or alternatively, the diversity view may provide a visualization of the professional diversity of the entire professional network of the corresponding enterprise (or some specific subset thereof). As another example, a growth view may be surfaced to provide a visualization of the size of the user's professional network over time. The growth view may also be further broken down to provide a visualization of the types and/or strengths of the user's professional contacts, including, for example, a visualization of the total number of connections versus the number of strong connections.

In various embodiments, the data-driven professional network expansion system also enables the enterprise itself to set particular professional networking goals and/or standards. The system may then utilize machine learning techniques to incorporate such goals and/or standards into specific professional networking programs that are designed to provide the desired outcome. As a first example, one professional networking program may be utilized to help a team within an enterprise to become and/or remain well connected to the larger organization, e.g., to be able to better access and disseminate information. In this example, when a team participates in the program, the desired outcome may be to have the aggregated professional network of the individual team members result in the overall team being only one connection away from any member of the larger enterprise. As a result, the system may provide targeted connection recommendations to team members based on the desired outcome. Moreover, in some embodiments, the system distributes connection recommendations that are close to each user's existing professional network, e.g., to make it easier for the user to connect to the suggested contacts.

As a second example, another professional networking program may be utilized to solve a retention issue for a team within an enterprise. As part of this program, to avoid team members simply leaving for another enterprise, the system may enable team members to connect with professional contacts within the enterprise who perform different roles and/or have different experiences (e.g., different clients, different types of work, different managers, different geographies, different regions, different peers, etc.). As a result, the system may provide professional networking suggestions including well-connected contacts who are dissimilar to the user, with the level of dissimilarity being dynamically adjustable depending on the parameters relating to the particular user and/or enterprise, as well as the details of the particular implementation.

The second aspect of the present techniques involves providing functionalities that reduce friction during the expansion of users' professional networks, thereby increasing the likelihood that network expansion will actually occur. In this context, the term "friction" refers generally to the difficulties, barriers, and/or inconveniences that naturally occur during professional networking, which often prevent users from effectively connecting with one another. In general, it is technologically simple to achieve a meeting between two users. However, it is much more difficult to ensure that those users actually connect or "click" in a cooperative manner during the meeting. Specific examples of friction that sometimes prevents effective connection between users include time zone difference, career level differences, relatively full schedules, vacations, reluctance to respond to event invitations and/or to actually attend such events, etc.

Therefore, this aspect of the present techniques includes using machine learning techniques to prioritize contacts for professional networking attempts based on parameters that indicate a likelihood of successful professional network expansion. Such parameters may include, but are not limited to, users' locations (e.g., geographies and/or regions), current positions, and career goals, as well as the goals/standards for the associated enterprise. Such parameters may also include the estimated likelihood of reach-out success for a particular user, which may be based, at least in part, on historical enterprise-level data indicating the likelihood of the user responding to a professional networking request. As a more specific example, one or more machine learning models may estimate the likelihood of reach-out success for a particular user based on historical enterprise-level data corresponding to, for example, the percentage of time that the user has accepted meeting invitations in the past, the percentage of time that the user has actually attended meetings for which the user accepted the meeting invitation, the length of such meetings, and/or any available third-party user ratings or feedback corresponding to the quality of such meetings.

Moreover, in some embodiments, the machine learning-based output is augmented using one or more heuristics corresponding to the users. As an example, if one user is located in Seattle and the other user is located in India, the likelihood of reach-out success may receive a lower score (e.g., due to the time zone difference). In contrast, if one user is located in Seattle and the other user is located in Atlanta, the likelihood of reach-out success may receive a higher score.

In various embodiments, the system further reduces the friction encountered during professional network expansion by providing integrated communication tools for outreach. For example, a standard, prepopulated email form and/or a general email template may be provided to aid the user in effectively sending professional networking requests to potential contacts. Additionally or alternatively, the system may provide the user with standard and/or user-specific suggestions during professional network expansion attempts. This may include, for example, providing the user with a prepopulated list of topics of mutual interest for communicating with a particular contact and/or identifying potential meeting times, meeting locations, and/or communication methods for the interaction.

More specifically, this aspect of the present techniques includes utilizing machine learning techniques, in combination with various parameters relating to particular users and/or associated enterprises, to reduce the amount of friction that is encountered during professional network expansion, e.g., by prioritizing which contacts are most likely to result in successful professional network expansion. For example, the system may prioritize furthering connections between users who have similarities, including both substantive similarities (e.g., same employer, same client, same role, same manager, same project, same school, same degree, same hometown, same state, similar hobbies/interests, follow the same or similar pages on social media, mutual contacts, etc.) and superficial similarities (e.g., same first name, same first letters of name, same birth month, etc.). Furthermore, in the event that an attempted connection between two users is successful, the system may further foster the connection by calling out or drawing attention to the similarities between the users. This may be provided in the form of a pop-up notification, message, email, alert, or text box, for example, surfaced on the professional network user interface of the enterprise application that is being utilized to make the connection (e.g., via meeting, chat, email, or the like). As an example, if the connection is in the form of a Microsoft® Teams® meeting, the system may surface a notification before and/or during the meeting that states the known similarities between the users. In some embodiments, the system additionally or alternatively encourages users to discover similarities independently, for example, by pointing the user to relevant resources relating to the other user (e.g., the other user's LinkedIn® account).

Even though most meetings are virtual in today's environment, the system may still prioritize in-person meetings, since in-person meetings have a much greater likelihood of fostering a true connection between people. To that end, the system may prioritize connection suggestions for users that are likely to be able to hold in-person meetings. For example, if two users live in the same city (or nearby cities) or work in the same office location (or offices that are within relatively close proximity), the system will be weighted towards attempting to connect those users. In some embodiments, this may include using machine learning techniques to determine whether users are likely to be able to achieve an in-person connection. As an example, the system may determine the likelihood that each user will be in the office on particular days of the week and may suggest an in-person meeting on a day when both users will be in the office. As another example, the system may determine a location of each user and then suggest a neutral meeting location that is somewhere between those two locations.

In various embodiments, the system utilizes historical enterprise-level data to increase the odds of successful connection and cooperation between users. As an example, if historical enterprise-level data indicates that a particular user does not send emails or attend meetings on Friday afternoons, the system may prevent other users from attempting to connect with that user on Friday afternoons. As another example, the system may recognize that users associated with a particular enterprise are typically non-responsive on the days immediately following a work holiday and may not suggest any attempted connections during that time. Additional examples of historical enterprise-level data include users' ratings from peers and the frequency with which particular users actually accept meeting invitations and/or respond to emails.

In various embodiments, the system includes a user feedback mechanism that enables users to rate the system's performance. For example, users may rate the relevance of the suggested connections and/or the quality of user interactions resulting from such suggested connections. Additionally or alternatively, the system may analyze feedback that is automatically provided in the form of telemetry data, including, for example, click-through data, read/open message data, accepted/rejected meeting data, meeting attendance data, meeting duration data, and the like. In such embodiments, the system then utilizes such feedback to dynamically update the parameters for providing the suggested connections and/or to automatically update or retrain the machine learning models that are used to determine the professional networking suggestions.

As a non-limiting example of the manner in which one or more machine learning models may be utilized to determine professional networking suggestions, the machine learning models may analyze various potential user connections simultaneously and return a ranking for each user. The system may then select the highest ranking users to provide as suggested connections. In some embodiments, the ranking is achieved in a linear fashion. As a non-limiting example, when attempting to connect a user with a similar user at the same enterprise, the following steps may be performed: (a) find a list of users who are working on the same account; (b) from this list, find all users who are project managers; (c) from this list, find all users in the same region; (d) from this list, find all users who share similarities; (e) analyze historical enterprise-level data corresponding to the users in this list to determine a final list of connections that are likely to be successful.

In some embodiments, the data-driven professional network expansion system described herein further facilitates successful professional networking connections by providing a list of potential topics to discuss (e.g., by surfacing the list of topics on the professional networking UI during a meeting). Such topics may include, for example, simple ice-breaker questions and/or activities, simple context-relevant information (e.g., the local time, weather, and/or news), and/or more specific topics that are based on the users' similarities, which are designed to spur further conversation.

In general, professional networking is a key part of the onboarding experience for new employees. For example, the manager may provide the new employee with a finite list of people to meet (e.g., usually optimized for the employee's immediate team and/or role). After the employee meets the people on that list, however, no further action is generally taken. This is not ideal since the new employee is generally not encouraged or incentivized to continue expanding their professional network. This may, in turn, result in stagnated employee growth, low employee satisfaction, and/or poor work product. Accordingly, the third aspect of the present techniques involves combining the first and second aspects to provide an employee onboarding tool that enables new employees to successfully connect with others in the enterprise and to expand their professional network, leading to better employee satisfaction and higher-quality work product. In some embodiments, the employee onboarding tool may also be used as an employee retention tool for existing employees, providing professional network expansion capabilities that are likely to cause existing employees to feel satisfied remaining with the particular enterprise.

In various embodiments, the employee onboarding tool may be provided, at least in part, via the professional networking UI described herein. When surfaced from the employer's (e.g., manager's) perspective, the professional networking UI may enable the setting of particular professional networking goals for new employees, such as, for example, goals for the initial professional network scope that are based on the new employee's particular position and/or progressive goals for the expansion of the employee's professional network that are based on desired career progression. The data-driven professional network expansion system described herein then utilizes the provided settings to provide professional networking suggestions according to parameters that are associated with such goals.

As described with respect to the first and second aspects of the present techniques, various parameters are utilized, in conjunction with machine learning techniques, to provide the employee onboarding tool. In particular, time-based parameters are used to determine changes in connection recommendations or contact suggestions over time. For example, when a user first begins working for an enterprise, the system may help to build a core professional network of peers, which may include contacts who are at a similar point in their career. As the user matures in their career, the system may connect the user with more senior contacts who perform similar roles, thus enabling the user to gain advice regarding appropriate career progression. In addition, the system may connect the user with dissimilar contacts so that the user is able to broaden their professional network and evaluate other potential roles. Later in the user's career, the system may connect the user with contacts who are early in their career, thus providing the user with the opportunity to fill a mentorship role.

As another example, project-based parameters and/or role-based parameters may be used to determine recommendations regarding new project(s) and/or new role(s), respectively, for the user. As one specific example, if the user's current project is either completed or almost completed, the employee onboarding tool may be used to "onboard" the user to a new project. The system may accomplish this by, for example, providing professional networking recommendations that are geared towards connecting the user with contacts who are working on projects that are relevant to the user. As another specific example, if the user recently started a new role and/or recently started working with a new client, the system may connect the user with contacts who are more established in the particular role and/or have experience with the particular client, for example.

In various embodiments, the data-driven professional network expansion system described herein provides automated notifications including professional networking recommendations that are tailored to the particular user. As an example, if a user is approaching a point in their career where other similar users typically receive a promotion, the system may automatically recognize that it is promotion time and may provide the user with notifications regarding potential contacts who would be helpful for securing the promotion. As another example, if a user is a new employee who has indicated an interest in particular projects and/or roles offered by the enterprise, the system may automatically suggest potential contacts who might help the user to learn about such projects and/or roles.

Furthermore, in various embodiments, the onboarding tool provided by the system leverages particular programs, such as the two exemplary programs described above, to advance the professional networking goals and/or standards of the corresponding enterprise. In such embodiments, the onboarding tool may automatically suggest relevant programs to particular users within the enterprise. Additionally or alternatively, users within the enterprise may manually sign up for particular programs (e.g., via the professional networking UI) to facilitate the goals of a particular team, for example.

Notably, the term "onboarding" as used herein may refer, not only to processes for initially hiring employees, but also to processes for retaining existing employees. As an example, the term "onboarding" may refer to processes for helping existing employees to be "onboarded" to new projects, new roles, or the like. In general, the term "onboarding" is used herein to describe processes by which employers both obtain and maintain employees, including by fostering individual employees' personal career growth.

In various embodiments, the data-driven professional network expansion system described herein is utilized in conjunction with, or integrated into, one or more application suites or platforms that are utilized by the enterprise corresponding to the user, allowing the system functionalities to be delivered via any number of different enterprise applications that are supported by the platform. Notably, as used herein, the term "enterprise application" refers to any suitable types of web-based applications, mobile applications, operating systems, and/or other applications/services that are provided by an application service provider. In general, the term "enterprise application" is used herein with reference to an application that forms part of a suite or package of products/services (or some subset of such suite/package) that is provided by the application service provider to enable users who are associated with an enterprise to interact with their corresponding computing systems to perform tasks relating to the enterprise. As a non-limiting example, if the application service provider is Microsoft Corporation, the enterprise applications described herein may include (but are not limited to) Microsoft® Viva®, Microsoft® Teams®, Microsoft® Outlook®, and/or Microsoft® Yammer® (among others). More generalized examples of suitable enterprise applications include (but are not limited to) email/communication applications, social networking applications, employee experience applications, calendar applications, and the like. In other words, the techniques described herein may be implemented within the context of a broad range of web-based applications, mobile applications, and/or additional applications/services that are utilized for enterprise-related tasks.

Furthermore, the data that are utilized for performing the techniques described herein are referred to as "enterprise-level data," meaning that such data are generally derived from users' interactions at the enterprise level (e.g., work- and/or career-related communications, tasks, and the like). However, in some cases, some amount of personal data may also be utilized, depending on the details of the particular implementation and the users' specific account settings. Moreover, in various embodiments, at least a portion of the enterprise-level data that are utilized for performing the techniques described herein are derived from one or more property graphs, such as, for example, Microsoft® Graph. In various embodiments, such property graph(s) include enterprise-level data that are maintained by the application service provider. Such enterprise-level data may include data objects (and metadata) relating to various types of enterprise resources, such as, for example, data objects relating to users, teams, chats, tasks, insights, coworkers, groups, calendars, files, messages, meetings, people, devices, learning resources, roles, projects, clients, and/or positions corresponding to the particular enterprise. In addition, in various embodiments, the property graph(s) include enterprise-level data that are provided by the enterprise itself. Such enterprise-level data may include data objects (and metadata) relating to logos, strings, links, structural/organizational information (e.g., information regarding administrators, employees, job titles, departments, and the like), and/or other types of enterprise resources that are maintained by the enterprise (e.g., in the enterprise's own database(s)). Moreover, in various embodiments, the property graph(s) further include data objects relating to telemetry that is owned and maintained by the application service provider. Such telemetry may include, for example, click-through data, read/open message data, accepted/rejected meeting data, meeting attendance data, meeting duration data, etc. Furthermore, according to embodiments described herein, the data derived from the property graph(s) are used to drive and/or enhance the functionalities provided by the data-driven professional network expansion system described herein, enabling such functionalities to be tailored to the goals and/or standards of the particular user and/or the associated enterprise.

The data-driven professional network expansion system described herein provides numerous advantages as compared to previous solutions. As an example, the network expansion system provides automatic professional contact suggestions with very minimal user input, thus saving users time and increasing the overall productivity for the corresponding enterprise. As another example, the network expansion system may automatically extract relevant parameters from enterprise-level data that are stored, at least in part, in a property graph that is maintained by the application service provider. This streamlines the professional networking process and also ensures that the process is customized to the particular enterprise with which the user is associated. In addition, the utilization of such enterprise-level data also ensures that the professional networking process is tailored to the particular user, since each user's work-related data are maintained in the property graph. As another example, the network expansion system is implemented, at least in part, using machine learning techniques with built-in feedback mechanisms, thus ensuring that the professional networking process can be continuously (or intermittently) updated to maintain relevancy in the quickly-evolving marketplace. As another example, the network expansion system can be easily integrated into existing enterprise applications and application suites, allowing the professional network process described herein to be effortlessly incorporated into already-functioning enterprise environments. As another example, the network expansion system is designed to automatically adapt the resulting output to time-based parameters, such as, in particular, parameters corresponding to the user's career level. In this manner, the system is customized to the user's current career goals. As another example, the network expansion system provides a professional networking UI including interactive visualizations that provide real-world context and information regarding professional networking. In addition, the professional networking UI includes UI elements that allow the user to indicate their personal professional networking goals, and the system is designed to customize the professional networking process to the user based on such goals.

Turning now to details regarding the accompanying drawings, FIG. 1 is a process flow diagram of a method 100 for automatic contact suggestion for professional network expansion according to embodiments described herein. The method 100 is executed via one or more computing systems, such as the exemplary computing system described with respect to FIG. 4. In particular, in various embodiments, the computing system(s) implementing the method 100 include computing system(s)/server(s) that are run by an application service provider who provides for the execution of an enterprise application (or a suite of enterprise applications) on remote computing systems associated with particular enterprises. The computing system(s) include one or more processors and one or more computer-readable storage media including computer-executable instructions that, when executed by the processor(s), cause the processor(s) to perform the blocks of the method 100. An exemplary embodiment of such computer-readable storage media is described with respect to FIG. 6. Moreover, in various embodiments, the method 100 is executed within the context of a network environment including one or more application service provider computing system(s)/server(s), as described further with respect to the exemplary network environment of FIG. 5.

The method 100 begins block 102, at which an enterprise application is executed, via the network, on a remote computing system operated by a user associated with an enterprise. At block 104, a professional networking UI is caused to be surfaced on a display of the remote computing system during the execution of the enterprise application.

At block 106, enterprise-level data corresponding to the user and the enterprise are accessed. In various embodiments, the method 100 also includes storing at least a portion of the enterprise-level data within one or more property graphs that are maintained by an application service provider for the enterprise application. In such embodiments, block 106 includes, at least in part, accessing the enterprise-level data by searching the property graph.

At block 108, parameters associated with the user and the enterprise are extracted from the enterprise-level data. In various embodiments, at least a portion of the extracted parameters include time-based parameters corresponding to the career stage of the user. Additionally or alternatively, in various embodiments, at least a portion of the extracted parameters include diversity-related parameters corresponding to the personal professional diversity of the user and/or the professional diversity of the overall enterprise. Additionally or alternatively, in various embodiments, at least a portion of the extracted parameters include project-based parameters corresponding to one or more projects that are currently assigned to the user and/or role-based parameters corresponding to one or more roles that are currently assigned to the user. Moreover, those skilled in the art will appreciate that any other suitable types of user-related parameters and/or enterprise-related parameters may additionally or alternatively be extracted, depending on the details of the particular implementation.

At block 110, the current professional network of the user and a list of suggested professional contacts for the user are automatically generated based on the extracted parameters. In various embodiments, this is performed using one or more machine learning models, such as one or more supervised and/or unsupervised machine learning models. Such machine learning models may utilize, for example, decision tree techniques and/or random forest techniques. Moreover, those skilled in the art will appreciate that any other suitable types of machine learning techniques may be utilized, depending on the details of the particular implementation.

In some embodiments, the method 100 also includes receiving, via one or more additional UI elements surfaced on the professional networking UI, additional user input including a specification of one or more professional networking intentions. In such embodiments, block 110 includes, at least in part, adapting the automatic generation of the list of suggested professional contacts based on the specification of the professional networking intention(s).

In some embodiments, the method 100 also includes receiving, via at least one additional UI element surfaced on the professional networking UI, additional user input including a specification of one or more key professional contacts of the user. In such embodiments, block 110 includes, at least in part, automatically generating the professional network of the user based on the specified key professional contact(s), in addition to the extracted parameters.

At block 112, user input including a selection of one or more of the suggested professional contacts is received via one or more UI elements surfaced on the professional networking UI. Moreover, at block 114, the selected professional contact(s) are automatically integrated into the surfaced professional networking UI to facilitate professional network expansion. As an example, this may include pinning the selected professional contact(s) onto the professional networking UI such that the user is able to easily view, compare, and/or interact with professional network expansion functionalities corresponding to the contact(s). As another example, this may include intermittently providing notifications (e.g., pop-ups, messages, emails, alerts, or the like) to the user with suggested methods, times, locations, and/or other recommendations for connecting with the selected professional contact(s).

The block diagram of FIG. 1 is not intended to indicate that the blocks of the method 100 are to be executed in any particular order, or that all of the blocks of the method 100 are to be included in every case. Moreover, any number of additional blocks may be included within the method 100, depending on the details of the specific implementation. For example, in various embodiments, the method 100 also includes causing the display, via the surfaced professional networking UI, of an interactive visualization of the professional network of the user. In such embodiments, at least a portion of the interactive visualization may include a digital representation of the change in size of the user's professional network over a specified length of time. Additionally or alternatively, in such embodiments, at least a portion of the interactive visualization may include a digital representation of the current personal professional diversity of the user and/or the projected personal professional diversity of the user after professional network expansion. Moreover, those skilled in the art will appreciate that the interactive visualization may also include digital representation(s) of any other suitable type(s) of professional networking information, displayed in any suitable manner.

Figure 2:
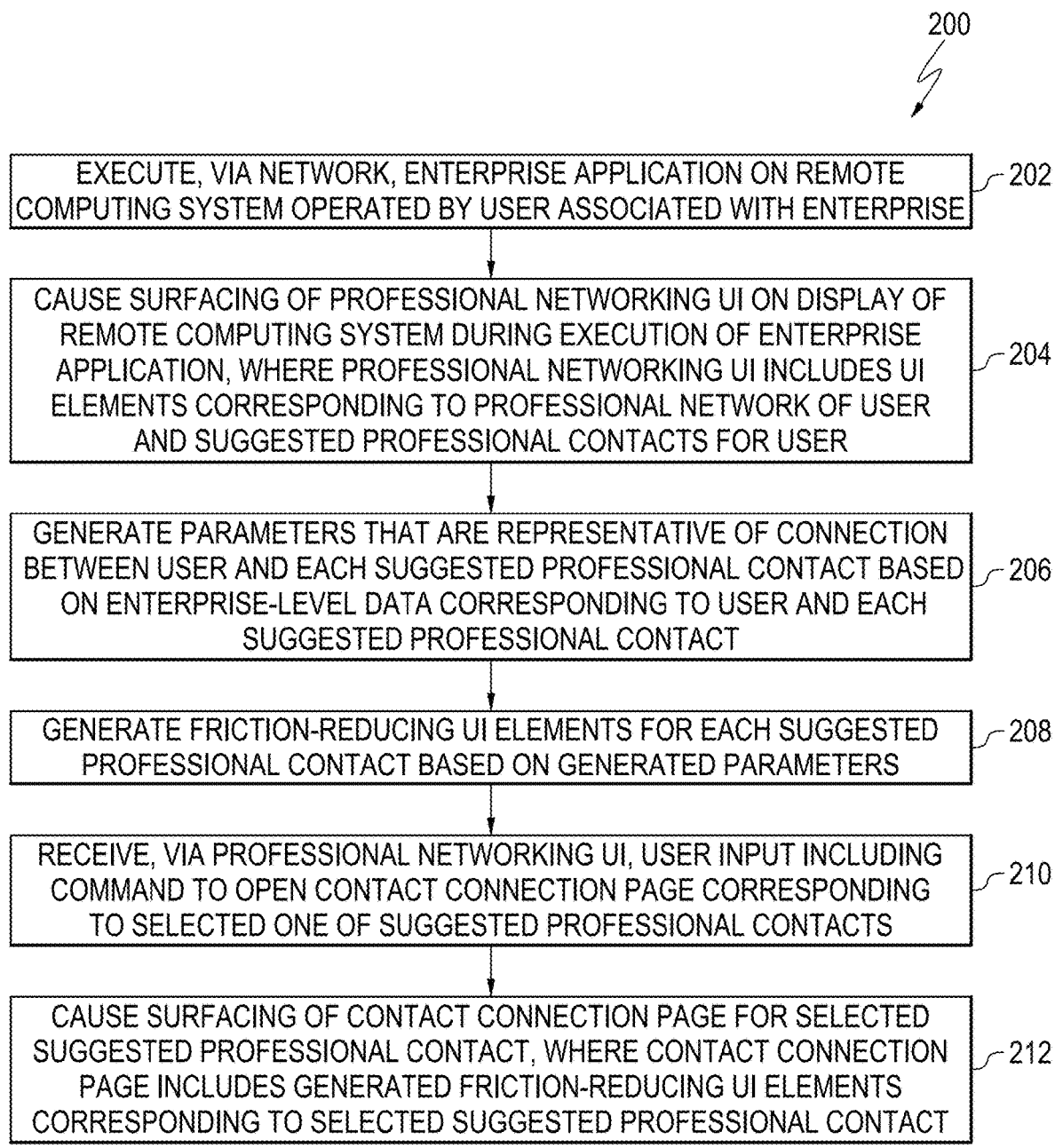
FIG. 2 is a process flow diagram of a method for friction reduction during professional network expansion according to embodiments described herein.

FIG. 2 is a process flow diagram of a method 200 for friction reduction during professional network expansion according to embodiments described herein. The method 200 is executed via one or more computing systems, such as the exemplary computing system described with respect to FIG. 4. In particular, in various embodiments, the computing system(s) implementing the method 200 include computing system(s)/server(s) that are run by an application service provider who provides for the execution of an enterprise application (or a suite of enterprise applications) on remote computing systems associated with particular enterprises. The computing system(s) include one or more processors and one or more computer-readable storage media including computer-executable instructions that, when executed by the processor(s), cause the processor(s) to perform the blocks of the method 200. An exemplary embodiment of such computer-readable storage media is described with respect to FIG. 6. Moreover, in various embodiments, the method 200 is executed within the context of a network environment including one or more application service provider computing system(s)/server(s), as described further with respect to the exemplary network environment of FIG. 5.

The method 200 begins block 202, at which an enterprise application is executed, via the network, on a remote computing system operated by a user associated with an enterprise. At block 204, a professional networking UI is caused to be surfaced on a display of the remote computing system during the execution of the enterprise application, where the professional networking UI includes UI elements corresponding to a professional network of the user and suggested professional contacts for the user.

At block 206, parameters that are representative of a connection between the user and each suggested professional contact are generated based on enterprise-level data corresponding to the user and each suggested professional contact. This may be accomplished, at least in part, using one or more machine learning models. Moreover, such parameters may include, for example, the location of the user, the location of the suggested professional contact, the current position of the user within the enterprise, the current position of the suggested professional contact within the enterprise, the career goal(s) of the user, goal(s) and/or standard(s) corresponding to the enterprise, the estimated likelihood of reach-out success for the suggested professional contact, the relationship between the user and the suggested professional contact (if any relationship exists), any previous interactions between the user and the suggested professional contact, any similarities between the user and the suggested professional contact, any mutual professional contacts between the user and the suggested professional contact, and/or any other suitable parameters that are representative of the current connection and/or possible future connection between the user and the suggested professional contact.

At block 208, friction-reducing UI elements are generated for each suggested professional contact based on the generated parameters. This may be accomplished, at least in part, using one or more machine learning models. Moreover, such friction-reducing UI elements may include, for example, an interactions panel that displays any interactions between the user and the suggested professional contact, an information panel that displays any similarities between the user and the suggested professional contact, an introductions panel that displays any mutual professional contacts between the user and the suggested professional contact, a notes box that enables the user to enter text regarding the suggested professional contact, a relationship drop-down menu that enables the user to specify a professional relationship between the user and the suggested professional contact, and/or a new event link that enables the user to schedule an introductory event (e.g., meeting) with the suggested professional contact.

At block 210, user input including a command to open a contact connection page corresponding to one of the suggested professional contacts is received via the professional networking UI. At block 212, the contact connection page for the suggested professional contact is caused to be surfaced on the display of the remote computing system, where the contact connection page includes at least a portion of the generated friction-reducing UI elements for the suggested professional contact.

In some embodiments, the method 200 also includes receiving, via the contact connection page, additional user input including an interaction with one of the friction-reducing UI elements. In such embodiments, an action corresponding to the selected friction-reducing UI element may then be performed. Such action may include, for example, specifying a relationship between the user and the professional contact, enabling entry of textual data corresponding to the professional contact (e.g., adding a note regarding the professional contact), displaying interactions between the user and the professional contact (e.g., in the form of lists of mutually-accessed files, overlapping calendar events, and/or mutual organizations/memberships, for example), scheduling an event with the professional contact, and/or sending a message to the professional contact or a mutual professional contact.

In some embodiments, such action may additionally or alternatively include displaying, sending, or otherwise conveying any similarities between the user and the professional contact. In such embodiments, the similarities may be displayed, sent, or otherwise conveyed to the user via a variety of different methods or channels. As an example, such similarities may be included within a meeting invitation or an email (e.g., as part of a Microsoft® Viva® Daily Summary email). As another example, such similarities may be added as an item or note within the user's calendar. As another example, such similarities may be displayed during the middle of a meeting and/or in between meetings (e.g., via the meeting chat functionality and/or as a pop-up notification).

The block diagram of FIG. 2 is not intended to indicate that the blocks of the method 200 are to be executed in any particular order, or that all of the blocks of the method 200 are to be included in every case. Moreover, any number of additional blocks may be included within the method 200, depending on the details of the specific implementation. For example, in various embodiments, the method 200 also includes receiving, via the professional networking UI, feedback regarding the contact connection page. Such feedback may include automated feedback that is generated using telemetry corresponding to the enterprise application (e.g., click-through data, read/open message data, accepted/rejected meeting data, meeting attendance data, and/or meeting duration data) and/or user feedback that is provided via a feedback functionality of the professional networking UI (e.g., user surveys, user ratings, and/or error reports). Furthermore, in such embodiments, the machine learning model(s) used to implement the method 200 are automatically updated based on the received feedback.

In various embodiments, the method 200 also includes integrating the parameters that are representative of the connection between the user and the suggested professional contact into a communication platform (e.g., an email functionality, message functionality, chat functionality, event functionality, or the like) of the enterprise application. In such embodiments, friction-reducing data corresponding to the parameters may then be surfaced during a communication between the user and the suggested professional contact via the communication platform. This may include, for example, pre-populating the communication platform with a list of similarities between the user and the suggested professional contact, potential topics of mutual interest, potential meeting times, potential meeting locations, and/or potential communication methods.

In various embodiments, the method 200 includes ranking a likelihood of professional network expansion between the user and each suggested professional contact based on the parameters that are representative of the connection between the user and each suggested professional contact. In such embodiments, a prioritized list of suggested professional contacts for the user may be generated based on the ranking, and the prioritized list may then be surfaced via the professional networking UI.

Figure 3:
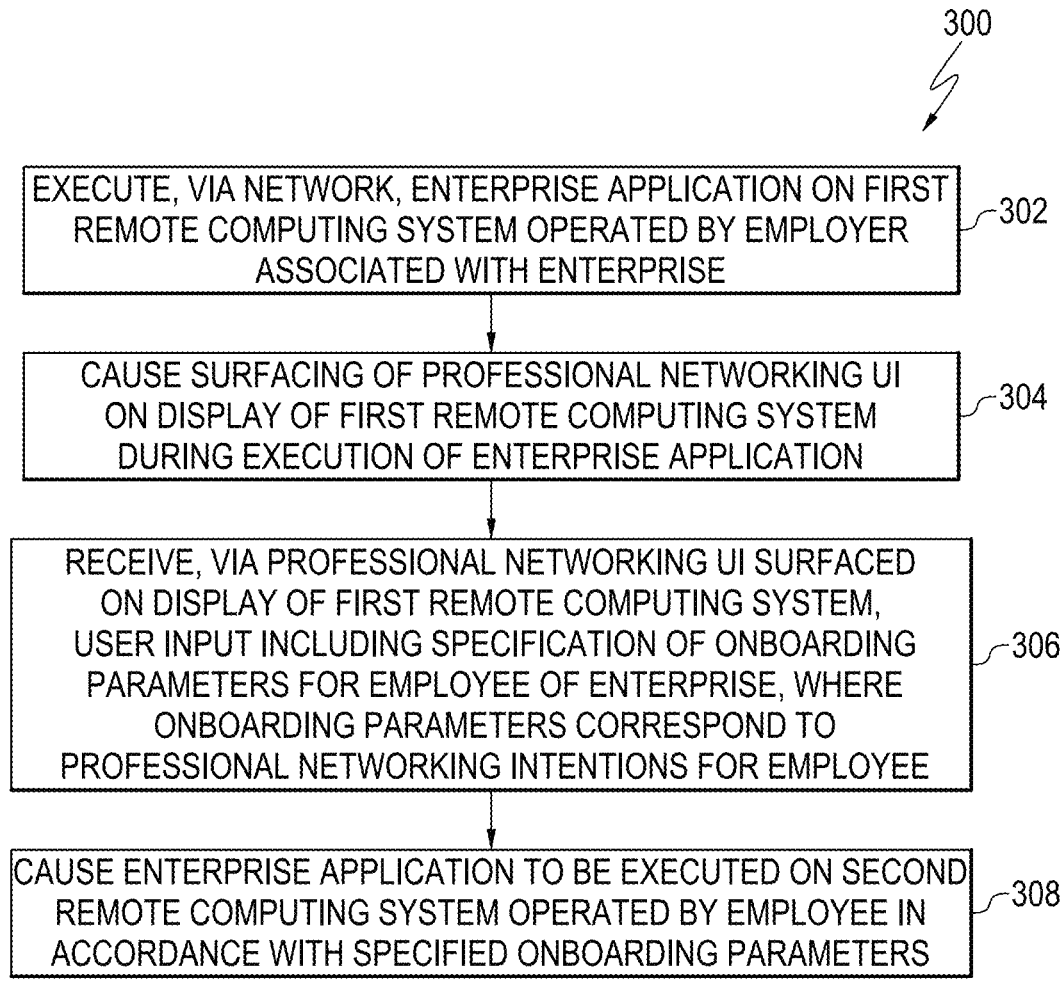
FIG. 3 is a process flow diagram of a method for integrated professional network expansion during employee onboarding according to embodiments described herein.

FIG. 3 is a process flow diagram of a method 300 for integrated professional network expansion during employee onboarding according to embodiments described herein. The method 300 is executed via one or more computing systems, such as the exemplary computing system described with respect to FIG. 4. In particular, in various embodiments, the computing system(s) implementing the method 300 include computing system(s)/server(s) that are run by an application service provider who provides for the execution of an enterprise application (or a suite of enterprise applications) on remote computing systems associated with particular enterprises. The computing system(s) include one or more processors and one or more computer-readable storage media including computer-executable instructions that, when executed by the processor(s), cause the processor(s) to perform the blocks of the method 300. An exemplary embodiment of such computer-readable storage media is described with respect to FIG. 6. Moreover, in various embodiments, the method 300 is executed within the context of a network environment including one or more application service provider computing system(s)/server(s), as described further with respect to the exemplary network environment of FIG. 5.

The method 300 begins block 302, at which an enterprise application is executed, via the network, on a first remote computing system operated by an employer associated with an enterprise. (Notably, as used herein, the term "employer" is used to refer broadly to any user who is associated with an enterprise and also performs some type of supervisory, managerial, or advisory role with regard to one or more employees of the enterprise). At block 304, a professional networking UI is caused to be surfaced on a display of the first remote computing system during the execution of the enterprise application.

At block 306, user input including a specification of onboarding parameters for an employee of the enterprise is received via the professional networking UI, where the onboarding parameters correspond to one or more professional networking intentions for the employee. In various embodiments, at least a portion of the specified onboarding parameters include time-based onboarding parameters that evolve based on an amount of time that the employee has been employed by the enterprise. Moreover, in some embodiments, the professional networking intention(s) for the employee include, at least in part, one or more goals for an initial scope of the employee's professional network and/or one or more progressive goals for the expansion of the employee's professional network over time. As other examples, the professional networking intention(s) may include, for example, goals relating to facilitating career progression, finding community, finding support, and/or learning how to effectively navigate as an employee of the enterprise.

At block 308, the enterprise application is caused to be executed on a second remote computing system operated by the employee in accordance with the specified onboarding parameters. This may include, for example, surfacing automated notifications with professional networking recommendations that are tailored to the employee. Additionally or alternatively, this may include, for example, automatically generating a list of suggested professional contacts for the user based on parameters extracted from enterprise-level data corresponding to the user and the enterprise, in combination with the specified onboarding parameters, as well as surfacing the list of suggested professional contacts on the display of the second remote computing system. Additionally or alternatively, this may include, for example, displaying an interactive visualization of the professional network of the employee with relation to the onboarding parameters specified by the employer.

In various embodiments, the method 300 also includes determining a professional networking program to be applied to the professional network of the employee, where the professional network program is adapted to the specified onboarding parameters. In such embodiments, the enterprise application may be executed on the second remote computing system in accordance with the professional networking program. Moreover, in some such embodiments, the method 300 also includes receiving, via the professional networking UI surfaced on the display of the first remote computing system, additional user input including a specification of the professional networking program to be applied. In other such embodiments, the method 300 includes automatically determining the professional networking program to be applied by applying a machine learning model to enterprise-level data corresponding to the employee and the enterprise, with the specified onboarding parameters as constraints.

The block diagram of FIG. 3 is not intended to indicate that the blocks of the method 300 are to be executed in any particular order, or that all of the blocks of the method 300 are to be included in every case. Moreover, any number of additional blocks may be included within the method 300, depending on the details of the specific implementation. Furthermore, in some embodiments, any of the methods 100, 200, and/or 300 (and/or any portions of such methods) may be integrated or combined in any suitable manner to facilitate the data-driven professional network expansion techniques described herein.

Figure 4:
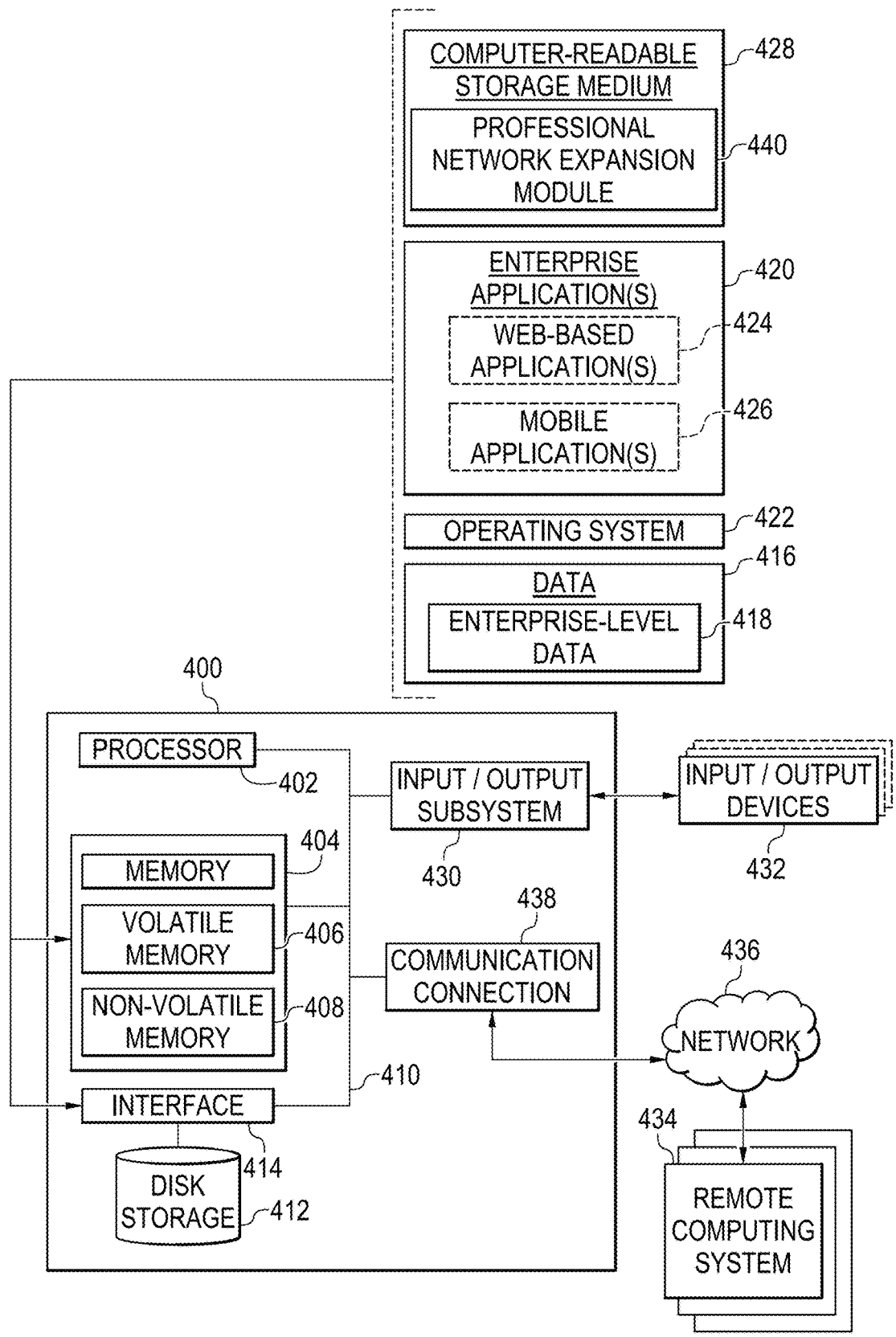
FIG. 4 is a block diagram of an exemplary computing system for implementing the data-driven professional network expansion techniques described herein.

FIG. 4 is a block diagram of an exemplary computing system 400 for implementing the data-driven professional network expansion techniques described herein. The exemplary computing system 400 includes a processor 402 and a memory 404. The processor 402 may include any suitable type of processing unit or device, such as, for example, a single-core processor, a multi-core processor, a computing cluster, or any number of other configurations. Moreover, the processor 402 may include an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combinations thereof, designed to perform the functions described herein.

The memory 404 typically (but not always) includes both volatile memory 406 and non-volatile memory 408. The volatile memory 406 retains or stores information so long as the memory is supplied with power. By contrast, the non-volatile memory 408 is capable of storing (or persisting) information even when a power supply is not available. The volatile memory 406 may include, for example, RAM (e.g., synchronous RAM (SRAM), dynamic RAM (DRAM), synchronous dynamic RAM (SDRAM), and the like) and CPU cache memory. The nonvolatile memory 408 may include, for example, read-only memory (ROM) (e.g., programmable ROM (PROM), electrically programmable ROM (EPROM), electrically erasable ROM (EEROM) or the like), flash memory, nonvolatile random-access memory (RAM), solid-state memory devices, memory storage devices, and/or memory cards.

The processor 402 and the memory 404, as well as other components of the computing system 400, are interconnected by way of a system bus 410. The system bus 410 can be implemented using any suitable bus architecture known to those skilled in the art.

According to the embodiment shown in FIG. 4, the computing system 400 also includes a disk storage 412. The disk storage 412 may include any suitable removable/non-removable, volatile/non-volatile storage component or device. For example, the disk storage 412 may include, but is not limited to, a magnetic disk drive, floppy disk drive, tape drive, Jaz drive, Zip drive, LS-210 drive, flash memory card, memory stick, or the like. In addition, the disk storage 412 may include storage media separately from (or in combination with) other storage media including, but not limited to, an optical disk drive, such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 412 to the system bus 410, a removable or non-removable interface is typically used, such as interface 414 shown in FIG. 4.

In various embodiments, the disk storage 412 and/or the memory 404 function as one or more databases that are used to store data 416 relating to the techniques described herein. Such data 416 may include, but are not limited to, enterprise-level data 418 (e.g., user profile data, device data, product data, usage data, telemetry, and the like), which may be obtained, at least in part, from a property graph that is owned by an application service provider that provides one or more enterprise application(s) 420 (or a suite of such applications) according to embodiments described herein. In some embodiments, a portion of the enterprise-level data 418 may also be independently maintained by the enterprise and then uploaded during the professional network expansion process described herein.

Those skilled in the art will appreciate that FIG. 4 describes software that acts as an intermediary between a user of the computing system 400 and the basic computing resources described with respect to the operating environment of the computing system 400. Such software includes an operating system 422. The operating system 422, which may be stored on the disk storage 412, acts to control and allocate the computing resources of the computing system 400. Moreover, the enterprise application(s) 418, including one or more web-based applications 424 and/or one or more mobile applications 426, take advantage of the management of the computing resources by the operating system 422 through one or more program modules stored within a computer-readable storage medium (or media) 428, as described further herein.

The computing system 400 also includes an input/output (I/O) subsystem 430. The I/O subsystem 430 includes a set of hardware, software, and/or firmware components that enable or facilitate inter-communication between the user of the computing system 400 and the processor 402 of the computing system 400. During operation of the computing system 400, the I/O subsystem 430 enables the user to interact with the computing system 400 through one or more I/O devices 432. Such I/O devices 432 may include any number of input devices or channels, such as, for example, one or more touchscreen/haptic input devices, one or more buttons, one or more pointing devices, one or more accessories, one or more audio input devices, and/or one or more video input devices, such as a camera. Furthermore, in some embodiments the one or more input devices or channels connect to the processor 402 through the system bus 410 via one or more interface ports (not shown) integrated within the I/O subsystem 430. Such interface ports may include, for example, a serial port, a parallel port, a game port, and/or a universal serial bus (USB).

In addition, such I/O devices 432 may include any number of output devices or channels, such as, for example, one or more audio output devices, one or more haptic feedback devices, and/or one or more displays. Such output devices or channels may use some of the same types of ports as the input devices or channels. Thus, for example, a USB port may be used to both provide input to the computing system 400 and to output information from the computing system 400 to a corresponding output device. Moreover, in some embodiments, the one or more output devices or channels are accessible via one or more adapters (not shown) integrated within the I/O subsystem 430.

In various embodiments, the computing system 400 is communicably coupled to any number of remote computing systems 434, such as remote computing systems that are operated by users (e.g., employees and/or employers) who are associated with an enterprise that utilizes (or subscribes to) the enterprise application(s) 420. The remote computing system(s) 434 may include, for example, one or more personal computers, one or more servers, one or more routers, one or more network PCs, one or more workstations, one or more microprocessor-based appliances, one or more mobile phones, and/or one or more peer devices or other common network nodes. As an example, in some embodiments, the computing system 400 is an application service provider server hosting the enterprise application(s) 420 in a networked environment using logical connections to the remote computing systems 434. In such embodiments, the computing system 400 may provide for execution of the enterprise application(s) 420 on the remote computing systems 434 with the enhanced functionality provided by the data-driven professional network expansion techniques described herein.

In various embodiments, the remote computing systems 434 are logically connected to the computing system 400 through a network 436 and then connected via a communication connection 438, which may be wireless. The network 436 encompasses wireless communication networks, such as local-area networks (LAN) and wide-area networks (WAN). LAN technologies include Fiber Distributed Data Interface (FDDI), Copper Distributed Data Interface (CDDI), Ethernet, Token Ring, and the like. WAN technologies include, but are not limited to, point-to-point links, circuit switching networks like Integrated Services Digital Networks (ISDN) and variations thereon, packet switching networks, and Digital Subscriber Lines (DSL).

The communication connection 438 includes the hardware/software employed to connect the network 436 to the bus 410. While the communication connection 438 is shown for illustrative clarity as residing inside the computing system 400, it can also be external to the computing system 400. The hardware/software for connection to the network 436 may include, for example, internal and external technologies, such as mobile phone switches, modems including regular telephone grade modems, cable modems and DSL modems, ISDN adapters, and/or Ethernet cards.

As described above, system applications, including the enterprise application(s) 420, take advantage of the management of the computing resources by the operating system 422 through one or more program modules stored within the computer-readable storage medium (or media) 428. In some embodiments, the computer-readable storage medium 428 is integral to the computing system 400, in which case it may form part of the memory 404 and/or the disk storage 412. In other embodiments, the computer-readable storage medium 428 is an external device that is connected to the computing system 400 when in use.

In various embodiments, the one or more program modules stored within the computer-readable storage medium 428 include program instructions or code that may be executed by the processor 402 to perform various operations. In various embodiments, such program modules include, but are not limited to, a data-driven professional network expansion module 440 that causes the processor 402 to perform operations that result in the execution of the data-driven professional network expansion techniques provided herein, as described with respect to, for example, the methods 100, 200, and/or 300 of FIGS. 1, 2, and/or 3, respectively.

It is to be understood that the block diagram of FIG. 4 is not intended to indicate that the computing system 400 is to include all of the components shown in FIG. 4. Rather, the computing system 400 can include fewer or additional components not illustrated in FIG. 4 (e.g., additional applications, additional modules, additional memory devices, additional network interfaces, etc.). Furthermore, any of the functionalities of the program module(s) may be partially, or entirely, implemented in hardware and/or in the processor 402. For example, the functionality may be implemented with an application specific integrated circuit, in logic implemented in the processor 402, or in any other device.

Figure 5:
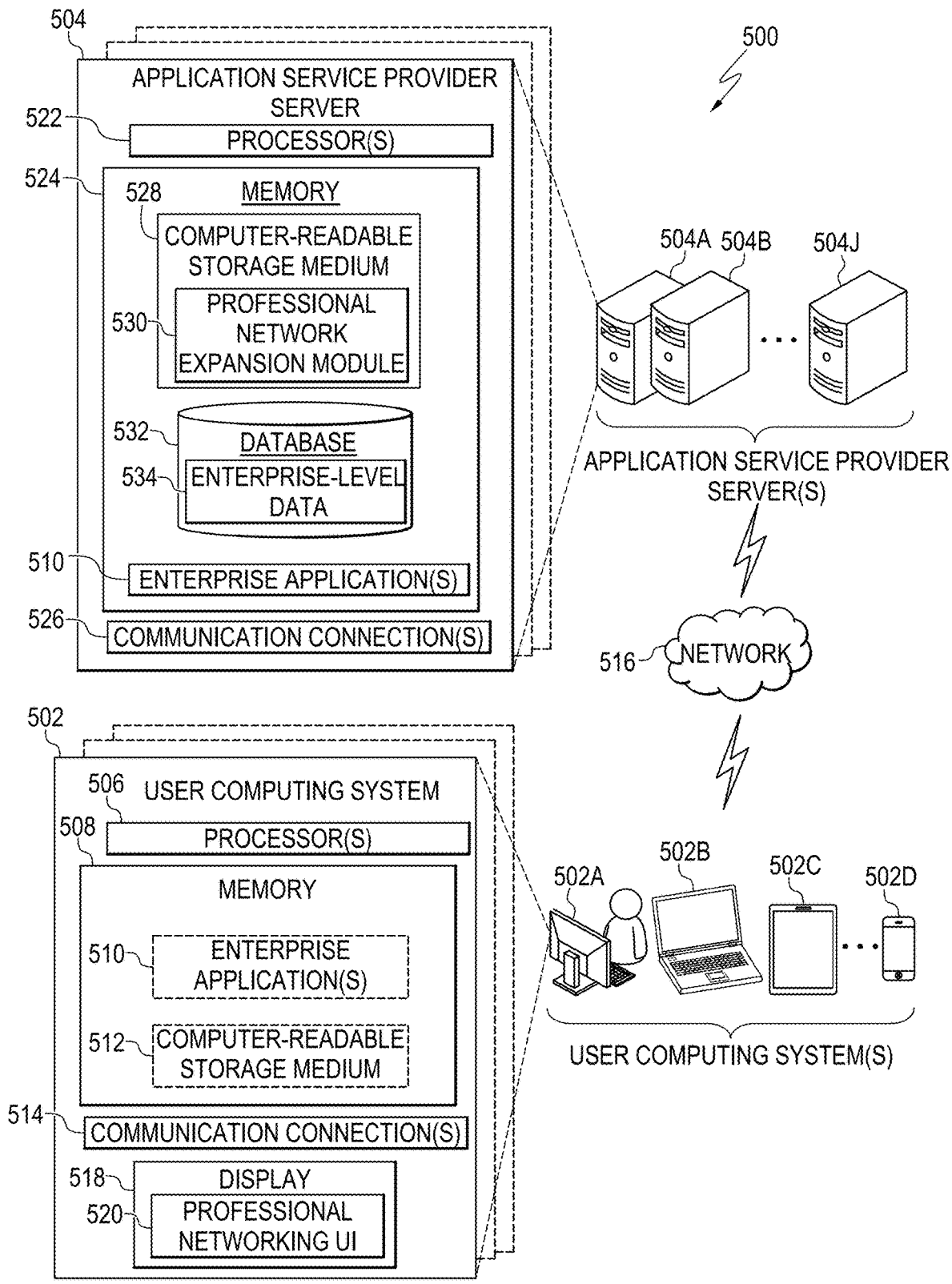
FIG. 5 is a block diagram of an exemplary network environment for implementing the data-driven professional network expansion techniques described herein.

FIG. 5 is a block diagram of an exemplary network environment 500 for implementing the data-driven professional network expansion techniques described herein. As shown in FIG. 5, the network environment 500 includes one or more user computing systems 502 and one or more application service provider servers 504. Each user computing system 502 includes one or more processors 506 and memory 508 communicably coupled to the processor(s) 506. Each user computing system 502 may be implemented as any type of computing system, including (but not limited to) a personal computer, a laptop computer, a tablet computer, a portable digital assistant (PDA), a mobile phone (e.g., a smart phone), an electronic book (e-book) reader, a game console, a set-top box (STB), a smart television (TV), a portable game player, a portable media player, and so forth. FIG. 2 shows representative user computing systems in the forms of a desktop computer 502A, a laptop computer 502B, a tablet 502C, and a mobile device 502D. However, these are merely examples, and the user computing system(s) 502 described herein may take many other forms.

Each user computing system 502 may optionally include one or more enterprise applications 510 (or data corresponding to the execution of such enterprise application(s)) and one or more computer-readable storage media 512 stored in the memory 508, as described with respect to the computing system 400 of FIG. 4, for example. Each user computing system 502 also includes a communication connection 514 by which the user computing system 502 is able to communicate with other devices, including the application service provider server(s) 504, over a network 516. Furthermore, each user computing system 502 includes a display 518, which may be a built-in display or an external display, depending on the particular type of computing system. According to embodiments described herein, the display 518 is configured to surface a professional networking UI 520 during the implementation of the data-driven professional network expansion techniques described herein.

The enterprise application(s) 510 and the corresponding data-driven professional network expansion techniques described herein may be implemented or hosted by the application service provider server(s) 504, which may be provided as one or more server farms or data centers, for example. As an example, in the embodiment shown in FIG. 5, the application service provider server 504 includes multiple servers 504A-J, for example. Moreover, it should be noted that the server components shown in FIG. 5 may each be implemented within any or all of the multiple application service provider servers 504, depending on the details of the particular implementation. Specifically, the application service provider server(s) 504 include one or more processors 522 communicably coupled to memory 524. The memory 524 may include one or more multiple memory devices, depending on the details of the particular implementation. The application service provider server(s) 504 also include one or more communication connections 526 by which the enterprise application(s) 510 described herein may be executed or hosted on the user computing system(s) via the network 516. In particular, the application service provider server(s) 504 provide for execution of the enterprise application(s) 510 on the user computing system(s) 502 by, for example, surfacing one or more UIs associated with the enterprise application(s) 510 (including the professional networking UI 520) on the display 520 corresponding to each user computing system 502.

The memory 524 includes the enterprise application(s) 510 described herein, as well as one or more computer-readable storage media 528. The computer-readable storage medium (or media) 528 includes the professional network expansion module 530 described herein (as some portion thereof), which includes computer-executable instructions that cause the processor(s) 522 and/or the processor(s) 506 to implement the data-driven professional network expansion techniques described herein. The memory 524 further includes a database 532, which may be configured to store (among other data) the enterprise-level data 534 described herein (or some portion thereof), optionally within one or more corresponding property graphs.

It is to be understood that the simplified block diagram of FIG. 5 is not intended to indicate that the network environment 500 is to include all of the components shown in FIG. 5. Rather, the network environment 500 may include different components and/or additional components not illustrated in FIG. 5. For example, in practice, the server(s) 502 will include a number of additional components not depicted in the simplified block diagram of FIG. 5, as described with respect to the computing system 400 of FIG. 4, for example.

Figure 6:
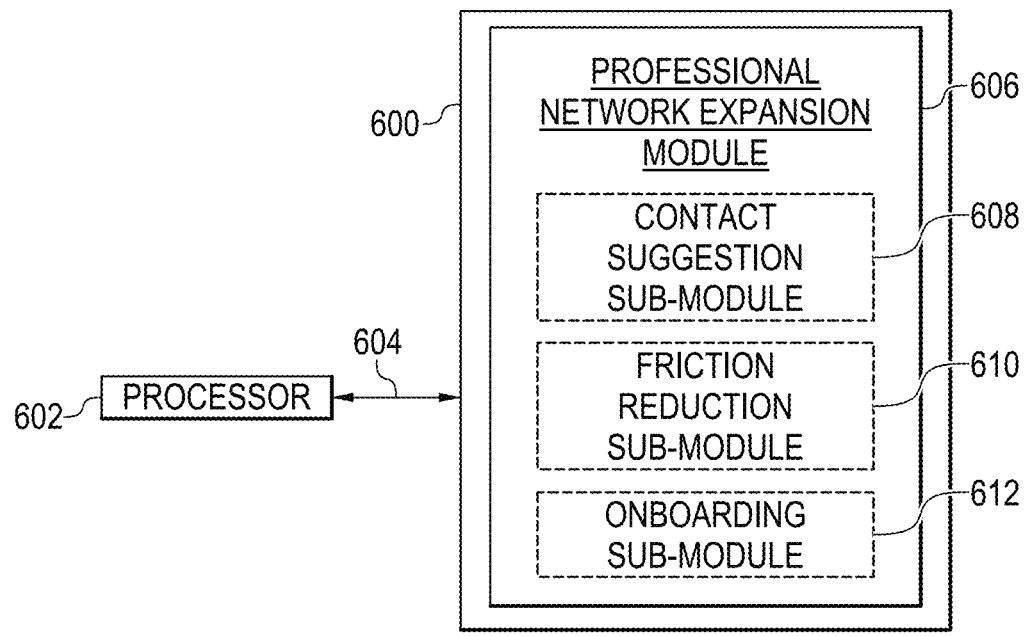
FIG. 6 is a block diagram of an exemplary computer-readable storage medium for implementing the data-driven professional network expansion techniques described herein.

FIG. 6 is a block diagram of an exemplary computer-readable storage medium (or media) 600 for implementing the data-driven professional network expansion techniques described herein. In various embodiments, the computer-readable storage medium 600 is accessed by a processor 602 over a computer interconnect (or system bus) 604. For example, in some embodiments, the computer-readable storage medium 600 is the same as, or similar to, the computer-readable storage medium (or media) described with respect to the computing system 400 of FIG. 4 and/or the network environment 500 of FIG. 5.

In various embodiments, the computer-readable storage medium 600 includes code that directs the processor 602 to perform the operations of the present techniques. Such code may be stored within the computer-readable storage medium 600 in the form of program modules, where each program module includes a set of computer-executable instructions that, when executed by the processor 602, cause the processor 602 to perform a corresponding set of operations. In particular, in various embodiments, the computer-readable storage medium 600 includes a data-driven professional network expansion module 606 that directs the processor 602 to perform the data-driven professional network expansion techniques described herein. Moreover, in various embodiments, the data-driven professional network expansion module 606 accomplishes this via one or more optional sub-modules. Such sub-modules may include, but are not limited to, a contact suggestion sub-module 608 (which may direct the processor 602 to execute the method 100 of FIG. 1, for example, or some suitable variation thereof), a friction reduction sub-module 610 (which may direct the processor 602 to execute the method 200 of FIG. 2, for example, or some suitable variation thereof), and/or an onboarding sub-module 612 (which may direct the processor 602 to execute the method 300 of FIG. 3, for example, or some suitable variation thereof).

Moreover, those skilled in the art will appreciate that any suitable number of the modules/sub-modules shown in FIG. 6 may be included within the computer-readable storage medium 600. Furthermore, any number of additional modules/sub-modules not shown in FIG. 6 may be included within the computer-readable storage medium 600, depending on the details of the specific implementation.

The following is a description of several exemplary implementations of the data-driven professional network expansion techniques described herein for particular use-case scenarios. Those skilled in the art will appreciate that these exemplary implementations are for illustrative purposes only. In practice, the techniques described herein may be implemented in any other suitable manner, depending on the details of the particular implementation.

Figure 7:
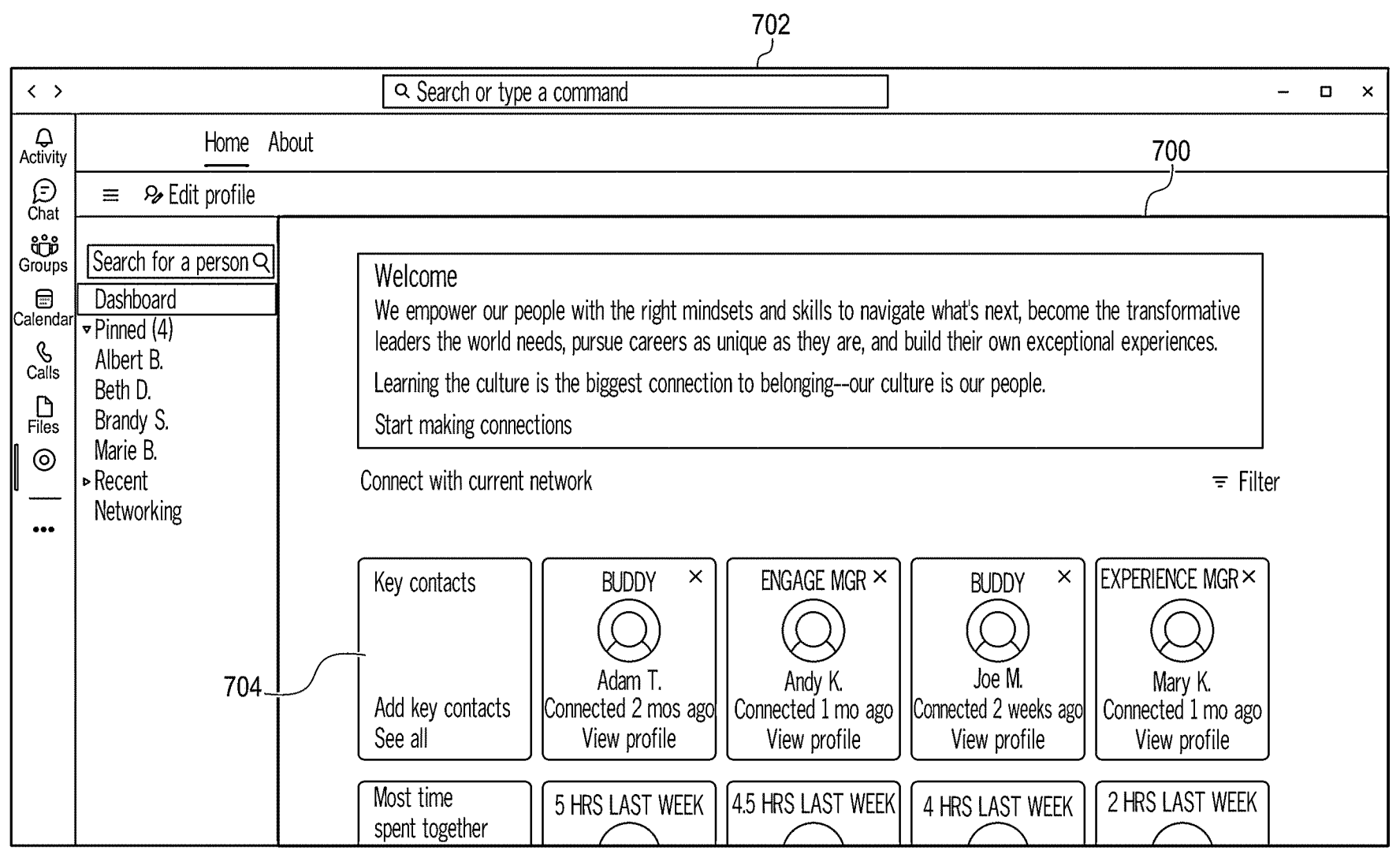

FIG. 7 is a schematic view showing an exemplary implementation in which a dashboard 700 of a professional networking UI 702 is surfaced with respect to a professional network expansion feature of an enterprise application. As examples, the enterprise application may be an email/communication application, social networking application, employee experience application, calendar application, or any other type of enterprise application that includes a user-to-user communication or networking feature. As shown in FIG. 7, the professional networking UI includes various UI elements that enable the user to interact with the professional network expansion feature, delivering a customized professional network expansion experience.

In the embodiment shown in FIG. 7, the dashboard 700 displays a welcome page for the professional network expansion feature, which includes one or more UI elements 704 that enable the user to specify key professional contacts that are already within the user's current professional network. Additionally or alternatively, in some embodiments, the professional network expansion feature automatically generates a list of key professional contacts based on enterprise-level data corresponding to the user. Moreover, such key professional contacts are utilized (in combination with parameters extracted from enterprise-level data corresponding to the user and the enterprise) to automatically generate the current professional network of the user.

Figure 8A:
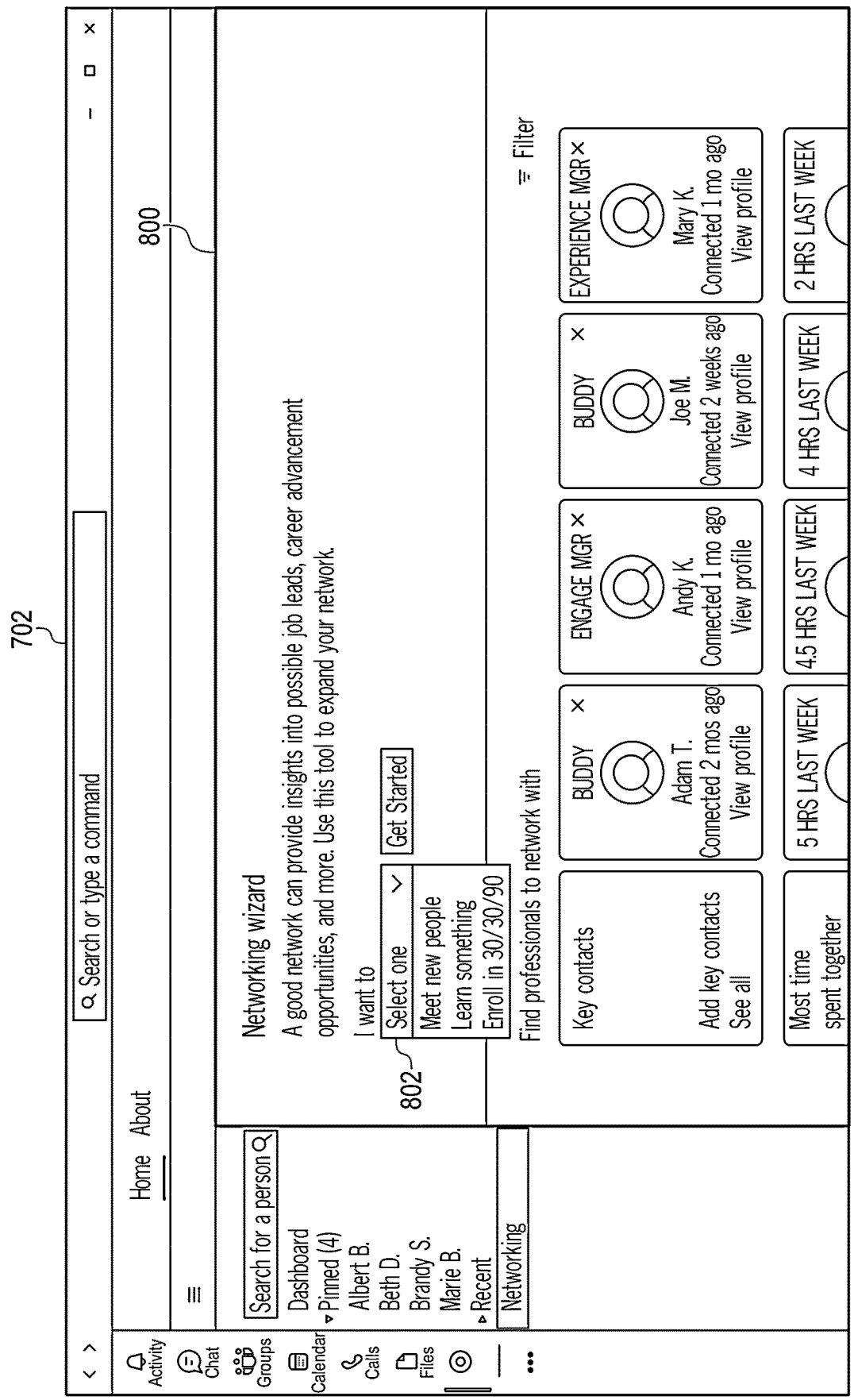
FIG. 8A is a schematic view showing an exemplary implementation in which a networking page of the professional networking UI is surfaced with respect to the professional network expansion feature of the enterprise application.

FIG. 8A is a schematic view showing an exemplary implementation in which a networking page 800 of the professional networking UI 702 is surfaced with respect to the professional network expansion feature of the enterprise application. Like numbered items are as described with respect to FIG. 7. As shown in FIG. 8A, the networking page 800 includes a networking wizard that is configured to automatically generate a list of suggested professional contacts for expanding the user's professional network based, at least in part, on the enterprise-level data corresponding to the user and the enterprise and (optionally) user-specified professional networking intentions or goals. As shown in the drop-down menu 802 in FIG. 8A, such user-specified professional networking intentions may include an overall professional networking goal of, for example, meeting new people, learning something, or enrolling in 30/30/90.

In the example shown in the drop-down menu 802 of FIG. 8A, the term "30/30/90" refers to a professional networking program (also referred to as the "30 Program") in which the user (e.g., a new employee) is encouraged to meet 30 people for 30 minutes each over a 90-day period. In various embodiments, the system described herein facilitates the 30 Program by automatically identifying and booking meetings with a specified number of potential contacts who share similarities with the user. In various embodiments, the system is designed to automatically perform this process in less than one minute in response to the user simply clicking on one or more UI elements within the professional networking UI 702. In this manner, the system reduces the professional networking burden by automating the professional network expansion process, rather than requiring the user to independently find and attempt to connect with 30 different contacts (as is required according to conventional professional networking approaches).

Figure 8B:
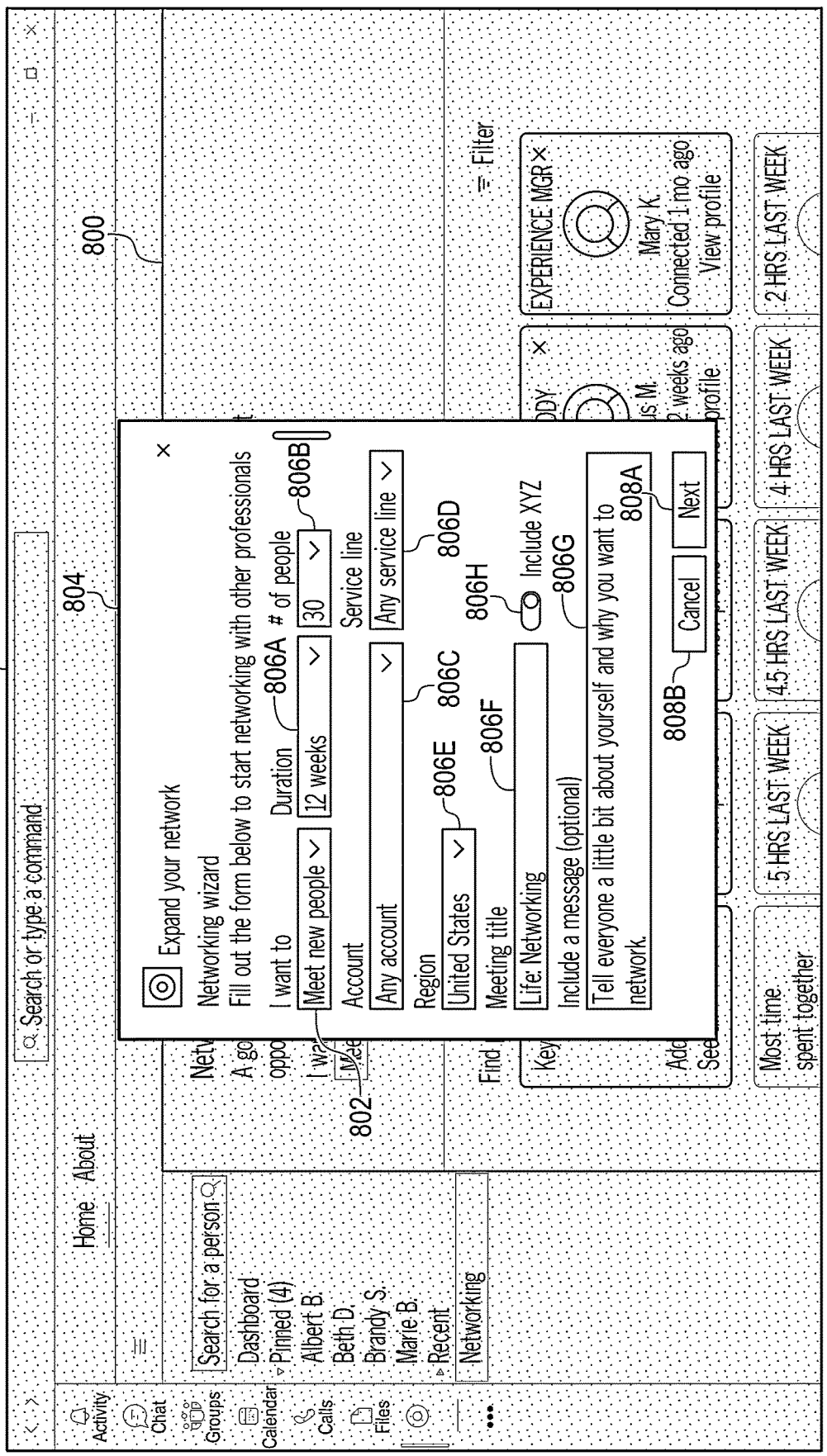
FIG. 8B is a schematic view showing an exemplary implementation in which a networking wizard box is surfaced on top of the networking page of FIG. 8A.

FIG. 8B is a schematic view showing an exemplary implementation in which a networking wizard box 804 is surfaced on top of the networking page 800 of FIG. 8A. The networking wizard box 804 includes UI elements that enable the user to specify additional professional networking intentions. As shown in FIG. 8B, such UI elements may include, for example, a drop-down menu 806A for specifying a duration of the professional network expansion process, a drop-down menu 806B for specifying a target number of professional contacts that the user wants to add to their professional network, and drop-down menus 806C, 806D, and 806E for specifying an account, service line, and region, respectively, for applying the professional network expansion process. In addition, the UI elements may include text boxes 806F and 806G for entering a standard meeting title and a meeting message, respectively, for the process, as well as a toggle 806H for specifying whether to include LinkedIn® contacts and/or data as part of the process. After specifying such professional networking intentions, the user may then select a "Next" button 808A for advancing to the next stage of the process or a "Cancel" button 808B for canceling the process.

Figure 8C:
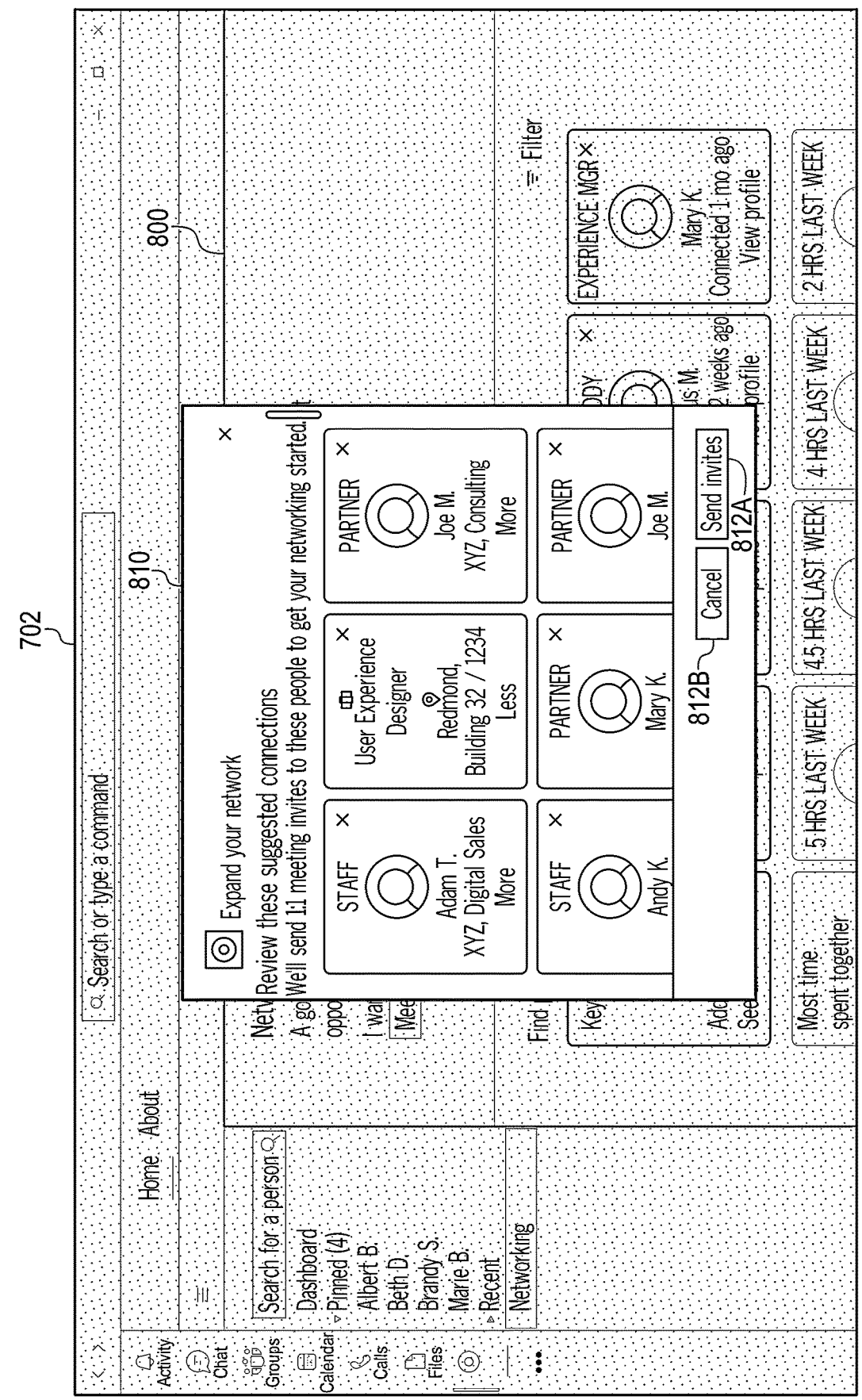
FIG. 8C is a schematic view showing an exemplary implementation in which a suggested professional contact box is surfaced on top of the networking page of FIGS. 8A and 8B.

FIG. 8C is a schematic view showing an exemplary implementation in which a suggested professional contact box 810 is surfaced on top of the networking page 800 of FIGS. 8A and 8B. The suggested professional contact box 810 includes a list of suggested professional contacts that have been automatically generated by applying machine learning techniques (e.g., one or more machine learning models) to parameters extracted from the enterprise-level data corresponding to the user and the enterprise, optionally in combination with the user-specified professional networking intentions (if any such intentions have been specified). The user may then select professional contacts with which they wish to attempt scheduling an event (e.g., a meeting) (and/or communicating in some other manner) for the purpose of professional network expansion. Once the user has selected all desired professional contacts from the list, the user may then select a "Send Invite" button 812A to direct the system to send meeting invitations (or any other suitable type of invitation or message) to such professional contacts, or the user may select a "Cancel" button 812B to cancel the process.

Figure 9:
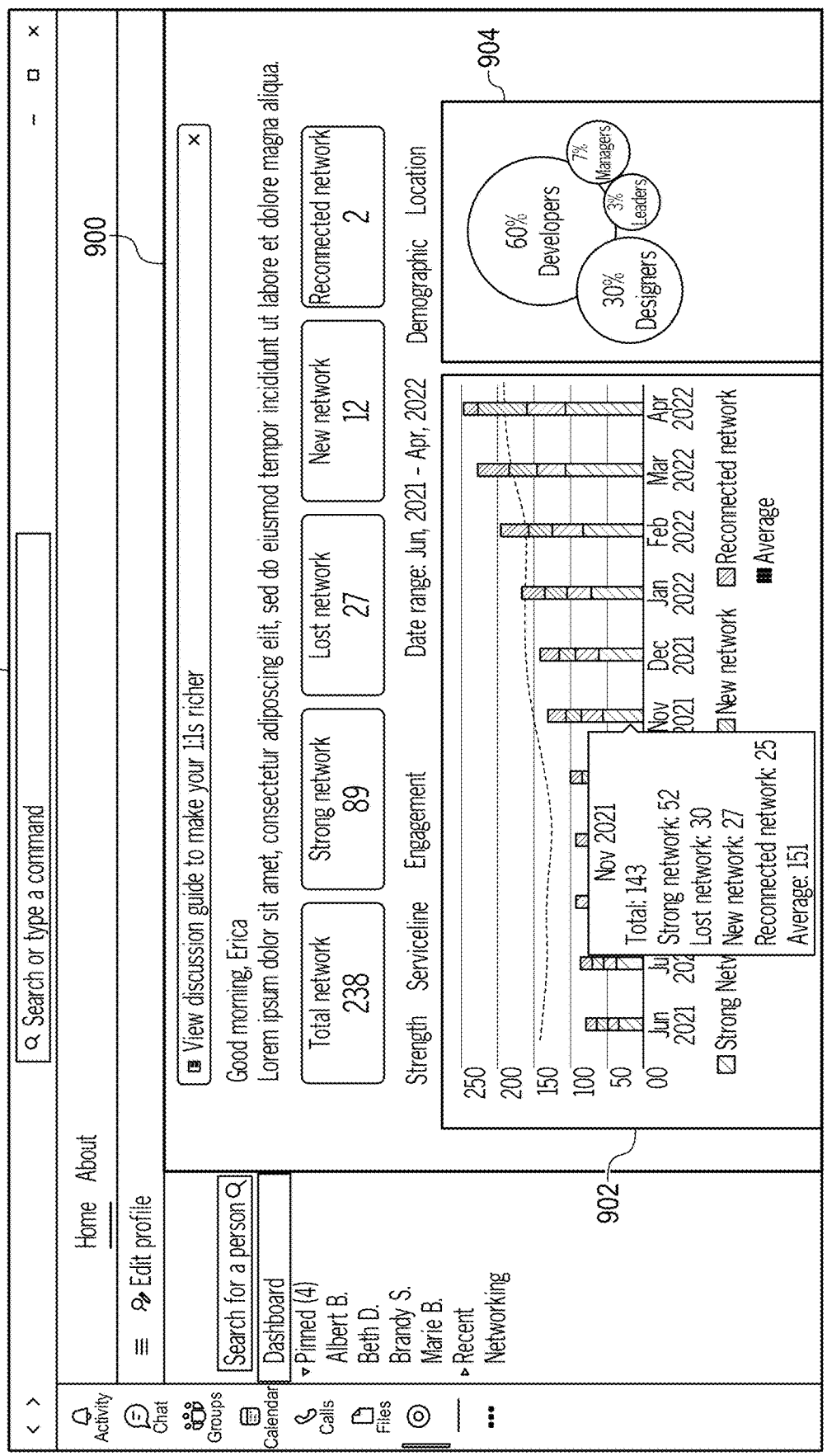
FIG. 9 is a schematic view showing an exemplary implementation in which a dashboard of the professional networking UI is surfaced with respect to the professional network expansion feature of the enterprise application.

FIG. 9 is a schematic view showing an exemplary implementation in which a dashboard 900 of the professional networking UI 702 is surfaced with respect to the professional network expansion feature of the enterprise application. Like numbered items are as described with respect to FIG. 7. In the embodiment shown in FIG. 9, the dashboard 900 displays an interactive visualization of the professional network of the user. While various visualization types may be included on the dashboard 900, the interactive visualizations shown in FIG. 9 include a growth view 902 that provides a digital representation of the change in the size of the user's professional network over a specified length of time, as well as a diversity view 904 that provides a digital representation of the current personal professional diversity of the user. In addition, according to the embodiment shown in FIG. 9, the dashboard includes additional statistics relating to the user's professional network, including the total number of connections, the number of strong connections, the number of lost connections, the number of new connections, and the number of renewed connections.

Figure 10A:
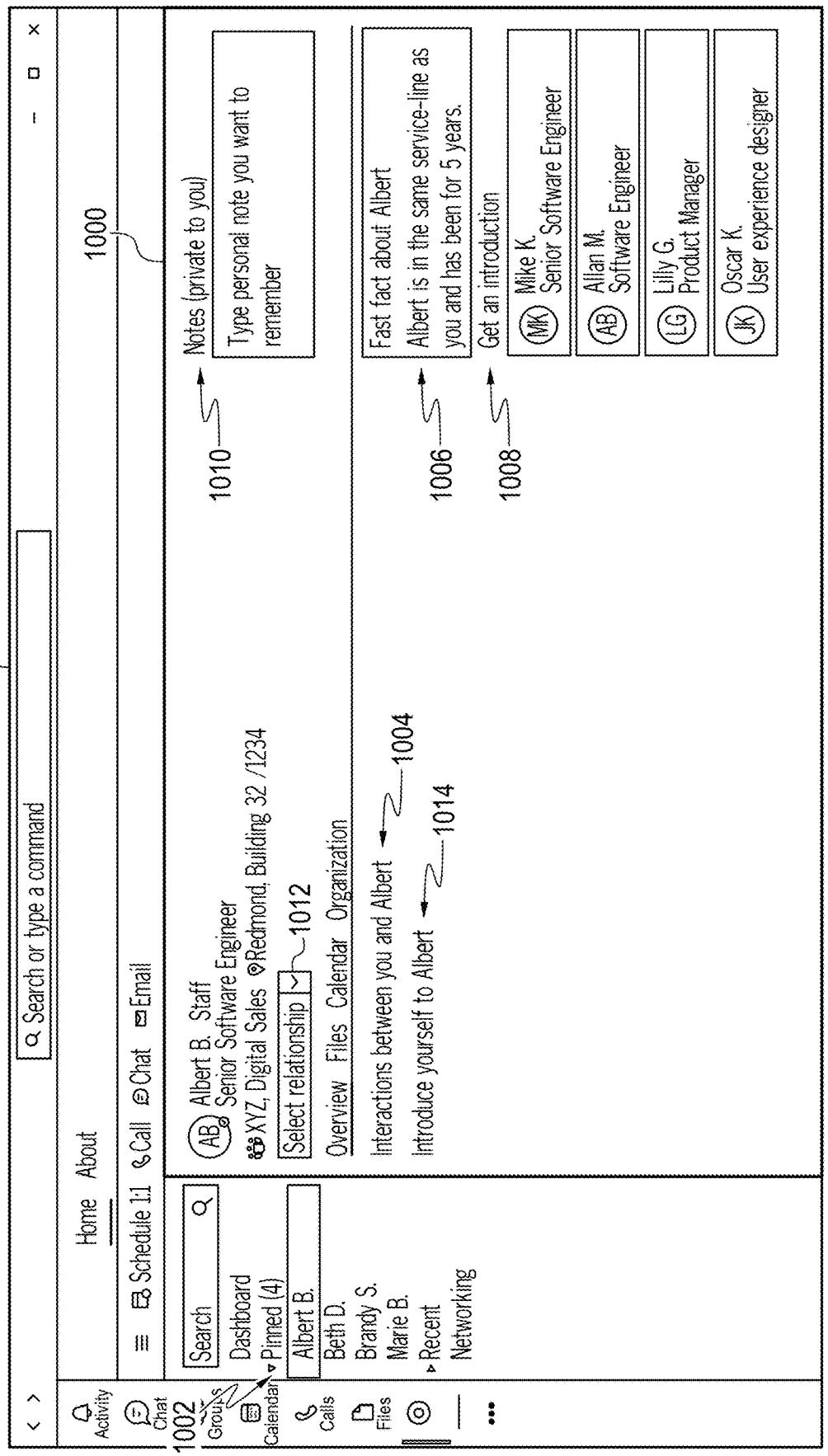
FIG. 10A is a schematic view showing an exemplary implementation in which a contact connection page of the professional networking UI is surfaced with respect to the professional network expansion feature of the enterprise application.

FIG. 10A is a schematic view showing an exemplary implementation in which a contact connection page 1000 of the professional networking UI 702 is surfaced with respect to the professional network expansion feature of the enterprise application. Like numbered items are as described with respect to FIG. 7. As shown in FIG. 10A, the professional networking UI 702 includes a list of pinned professional contacts 1002, which may include the professional contacts that the user selected from the automatically-generated list of suggested professional contacts. In this manner, once the user selects the desired professional contacts from the list, the selected professional contacts are automatically integrated into the surfaced professional networking UI to facilitate professional network expansion.

As shown in FIG. 10A, the contact connection page 1000 includes various UI elements that are configured to reduce the amount of friction that the user encounters when attempting to expand their professional network via connecting with any of the pinned suggested professional contacts, for example. According to the embodiment shown in FIG. 10A, such friction-reducing UI elements include an interactions panel 1004 that shows any interactions that have occurred between the user and the particular pinned professional contact. Such interactions panel 1004 may include, for example, an Overview section that shows all interactions between the user and the contact, a Files section that shows any shared and/or mutually-accessed files between the user and the contact, a Calendar section that shows any shared events between the user and the contact, and/or an Organizations section that shows any mutual organizations or memberships between the user and the contact. Additionally or alternatively, the friction-reducing UI elements may include an information panel 1006 (e.g., a "fast facts" section) that provides the user with information regarding one or more similarities between the user and the particular contact. Additionally or alternatively, the friction-reducing UI elements may include an introductions panel 1008 that provides the user with a list of mutual professional contacts who may be open to introducing the user to the particular contact. In some embodiments, each mutual professional contact listed within the introductions panel 1008 may include a message link that, responsive to user selection, opens a message box that enables the user to send a message to the corresponding mutual professional contact to, for example, request such contact to introduce the user to the suggested professional contact with which they are mutually acquainted. This embodiment is shown and described further with respect to FIG. 10C. Additionally or alternatively, the friction-reducing UI elements may include a notes box 1010 that enables the user to enter personal notes regarding the contact. Additionally or alternatively, the friction-reducing UI elements may include a relationship drop-down menu 1012 that enables the user to specify a professional relationship between the user and the contact. The relationship options within the relationship drop-down menu 1012 may include, for example, buddy, counselor, boss, ambassador, mentor, manager, general, or the like. Additionally or alternatively, the friction-reducing UI elements may include a new event link 1014 that, responsive to user selection, opens a new event box for scheduling an introductory event (e.g., a meeting) with the professional contact, as described further with respect to FIG. 10B. Overall, the contact connection page 1000 alleviates the hardships and inconveniences that often prevent users from successfully expanding their professional networks by providing the relevant information regarding potential professional contacts in one easily-accessible place within the professional networking UI 702.

Figure 10B:
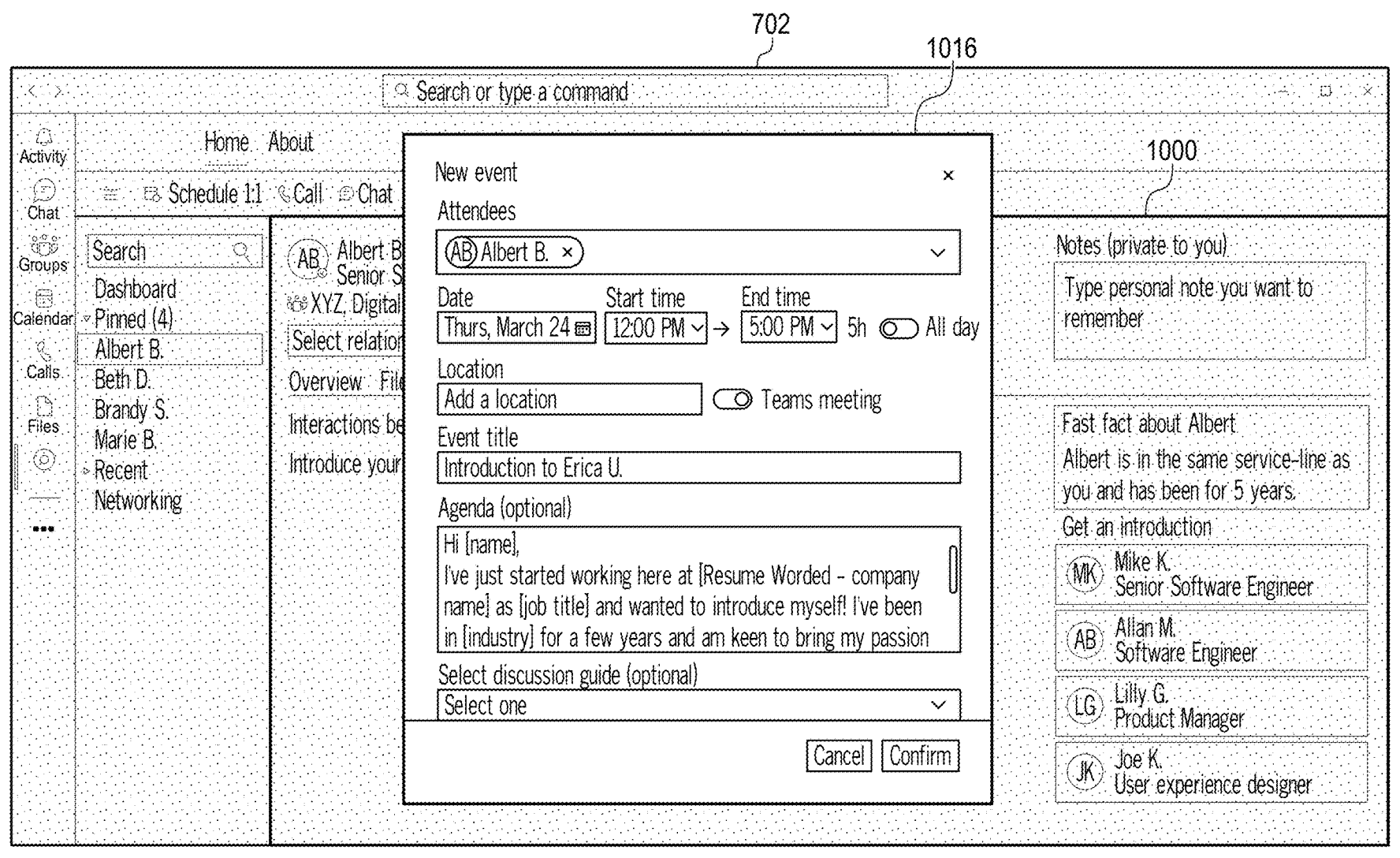
Figure 10C:
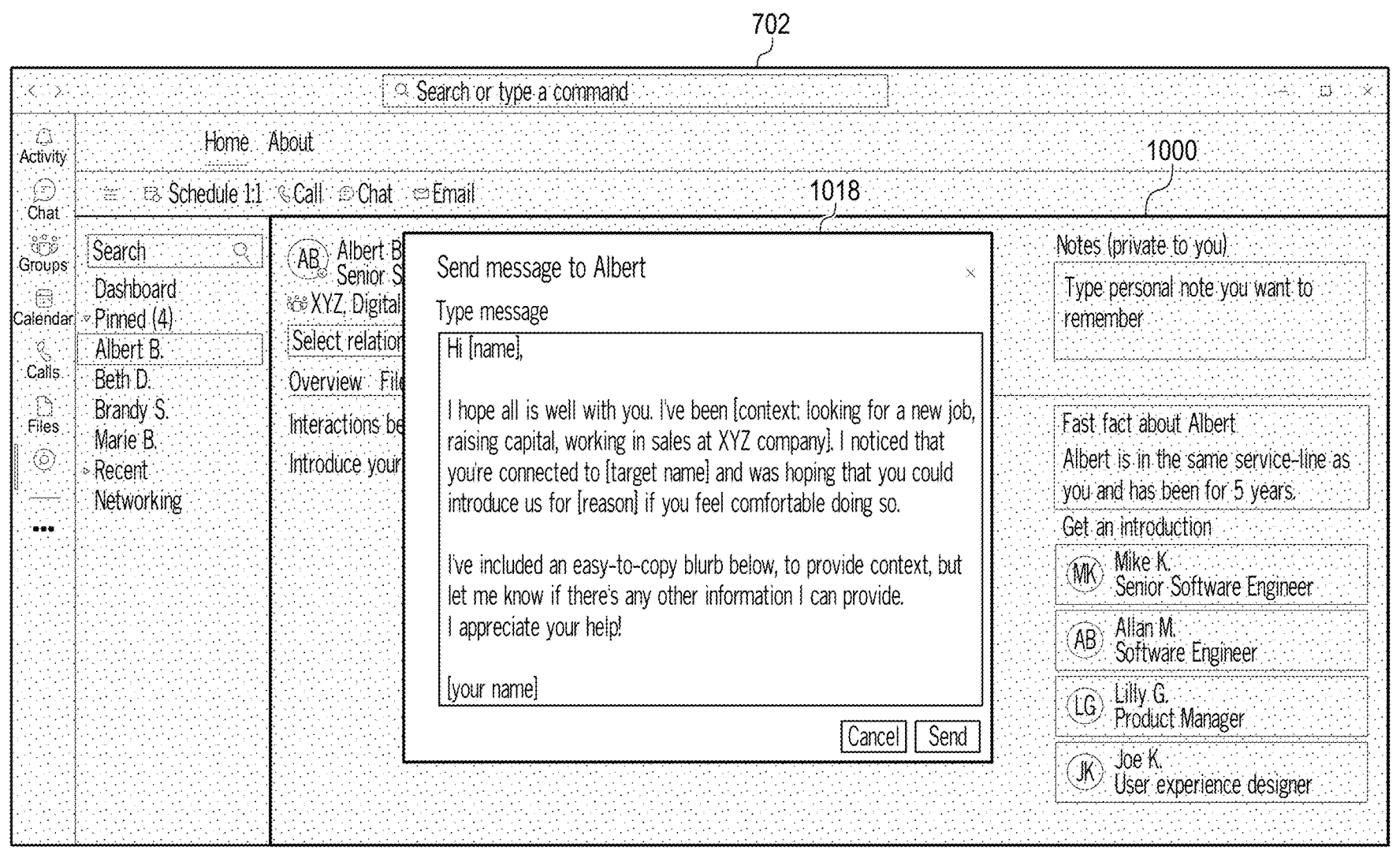

FIG. 10B is a schematic view showing an exemplary implementation in which a new event box 1016 is surfaced on top of the contact connection page 1000 of FIG. 10A. The new event box 1016 provides UI elements that enable the user to specify details regarding an event (e.g., a meeting) with a potential professional contact. In this manner, the user may attempt to schedule events that will serve as an introduction to any or all of the professional contacts that were suggested by the professional network expansion feature of the enterprise application.

FIG. 100 is a schematic view showing an exemplary implementation in which a message box 1018 is surfaced on top of the contact connection page 1000 of FIGS. 10A and 10B. The message box 1018 includes UI elements that enable the user to insert text to be sent to a potential professional contact. In this manner, the user may send messages that will serve as an introduction to any or all of the professional contacts that were suggested by the professional network expansion feature of the enterprise application. Additionally or alternatively, the user may send messages that seek assistance from a professional contact within the user's professional network with setting up an introductory event or meeting with a mutual professional contact that was suggested by the professional network expansion feature of the enterprise application.

As a general matter, some components shown in the figures are described herein in the context of one or more structural components, referred to as functionalities, modules, features, elements, etc. However, the components shown in the figures can be implemented in any manner, for example, by software, hardware (e.g., discrete logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, and the like, or any combination of these implementations. As used herein, hardware may include computing systems, discrete logic components, such as application specific integrated circuits (ASICs), and the like, as well as any combinations thereof.

As for terminology, the phrase "configured to" encompasses any way that any kind of structural component can be constructed to perform an identified operation. The structural component can be configured to perform an operation using software, hardware, firmware and the like, or any combinations thereof. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware.

The term "logic" encompasses any functionality for performing a task. For instance, each operation illustrated in the flowcharts corresponds to logic for performing that operation. An operation can be performed using software, hardware, firmware, etc., or any combinations thereof.

As utilized herein, the terms "component", "system", and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any tangible computer-readable storage medium.

Moreover, as used herein, the term "computer-readable storage medium" refers to an article of manufacture. In general, computer-readable storage media are used to host, store and/or reproduce computer-executable instructions and data for later retrieval and/or execution. When the computer-executable instructions that are hosted or stored on the computer-readable storage media are executed by a processor of a computing system, the execution thereof causes, configures and/or adapts the executing computing system to carry out various steps, processes, routines, methods and/or functionalities, including the steps, processes, routines, methods, and/or functionalities described herein. Examples of computer-readable storage media include, but are not limited to, optical storage media (such as Blu-ray discs, digital video discs (DVDs), compact discs (CDs), optical disc cartridges, and the like), magnetic storage media (such as hard disk drives, floppy disks, magnetic tape, and the like), memory storage devices (such as random access memory (RAM), read-only memory (ROM), memory cards, thumb drives, and the like), and cloud storage (such as online storage services). Computer-readable storage media may deliver computer-executable instructions to a computing system for execution via various transmission means and mediums, including carrier waves and/or propagated signals. However, for purposes of this disclosure, the term "computer-readable storage medium (or media)" refers specifically to non-transitory forms of computer-readable storage media and expressly excludes carrier waves and/or propagated signals.

The singular forms "a", "an", and "the", as used herein, mean one or more when applied to any embodiment described herein. In other words, the use of "a", "an", and/or "the" does not limit the meaning to a single feature unless such a limit is specifically stated. Moreover, the term "any" may refer to one, some, or all of a specified entity, if any of the specified entity exists or is present.

The term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B", when used in conjunction with open-ended language such as "including", may refer, in one embodiment, to A only (optionally including entities other than B); in another embodiment, to B only (optionally including entities other than A); in yet another embodiment, to both A and B (optionally including other entities).

The phrase "at least one", when used in reference to a list of one or more entities, should be understood to mean at least one entity selected from any one or more of the entities in the list of entities, but not necessarily including at least one of each and every entity specifically listed within the list of entities, and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A or B" (or, equivalently, "at least one of A and B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one", "one or more", and "and/or" are open-ended expressions that are both conjunctive and disjunctive in operation.

The phrase "based on" should not be construed to mean "based only on", unless expressly specified otherwise. In other words, the phrase "based on" means "based only on", "based at least on", and/or "based at least in part on".

The present techniques may be susceptible to various modifications and alternative forms, including (but not limited to) those described in the following examples:

Example 1 is a method for friction reduction during professional network expansion. The method is implemented via a computing system including a processor. The method includes: executing, via a network, an enterprise application on a remote computing system operated by a user associated with an enterprise; causing surfacing of a professional networking UI on a display of the remote computing system during the execution of the enterprise application, where the professional networking UI includes UI elements corresponding to a professional network of the user and suggested professional contacts for the user; generating parameters that are representative of a connection between the user and each suggested professional contact based on enterprise-level data corresponding to the user and each suggested professional contact; generating friction-reducing UI elements for each suggested professional contact based on the generated parameters; receiving, via the professional networking UI, user input including a command to open a contact connection page corresponding to one of the suggested professional contacts; and causing surfacing of the contact connection page for the suggested professional contact on the display of the remote computing system, where the contact connection page includes at least a portion of the generated friction-reducing UI elements Example 2 includes the method of example 1, including or excluding optional features. In this example, the method includes utilizing a machine learning model to perform at least one of the generation of the parameters or the generation of the friction-reducing UI elements.

Example 3 includes the method of example 2, including or excluding optional features. In this example, the method further includes: receiving, via the professional networking UI, feedback regarding the contact connection page; and updating the machine learning model based on the feedback Example 4 includes the method of any one of examples 1 to 3, including or excluding optional features. In this example, the parameters that are representative of the connection between the user and each suggested professional contact include at least one of: a location of the user; a location of the suggested professional contact; a current position of the user within the enterprise; a current position of the suggested professional contact within the enterprise; a career goal of the user; at least one of a goal or a standard corresponding to the enterprise; an estimated likelihood of reach-out success for the suggested professional contact; a relationship between the user and the suggested professional contact; any interactions between the user and the suggested professional contact; any similarities between the user and the suggested professional contact; or any mutual professional contacts between the user and the suggested professional contact.

Example 5 includes the method of any one of examples 1 to 4, including or excluding optional features. In this example, the friction-reducing UI elements include at least one of: an interactions panel that displays any interactions between the user and the suggested professional contact; an information panel that displays any similarities between the user and the suggested professional contact; an introductions panel that displays any mutual professional contacts between the user and the suggested professional contact; a notes box that enables the user to enter text regarding the suggested professional contact; a relationship drop-down menu that enables the user to specify a professional relationship between the user and the suggested professional contact; or a new event link that enables the user to schedule an introductory event with the suggested professional contact.

Example 6 includes the method of any one of examples 1 to 5, including or excluding optional features. In this example, the method further includes: receiving, via the contact connection page, additional user input including an interaction with one of the friction-reducing UI elements; and performing an action corresponding to the selected friction-reducing UI element.

Example 7 includes the method of any one of examples 1 to 6, including or excluding optional features. In this example, the method further includes: integrating the parameters that are representative of the connection between the user and the suggested professional contact into a communication platform of the enterprise application; and, during a communication between the user and the suggested professional contact via the communication platform, causing surfacing of friction-reducing data corresponding to the parameters.

Example 8 includes the method of example 7, including or excluding optional features. In this example, causing the surfacing of the friction-reducing data corresponding to the parameters includes pre-populating the communication platform with at least one of similarities between the user and the suggested professional contact, potential topics of mutual interest, potential meeting times, potential meeting locations, or potential communication methods.

Example 9 includes the method of any one of examples 1 to 8, including or excluding optional features. In this example, the method further includes: ranking a likelihood of professional network expansion between the user and each suggested professional contact based on the parameters that are representative of the connection between the user and each suggested professional contact; generating a prioritized list of suggested professional contacts for the user based on the ranking; and causing the surfacing of the prioritized list via the professional networking UI.

Example 10 includes a computer-readable storage medium. The computer-readable storage medium includes computer-executable instructions that, when executed by a processor, cause the processor to: execute an enterprise application on a computing system operated by a user associated with an enterprise; cause surfacing of a professional networking UI on a display of the computing system during the execution of the enterprise application, where the professional networking UI includes UI elements corresponding to a professional network of the user and suggested professional contacts for the user; generate parameters that are representative of a connection between the user and each suggested professional contact based on enterprise-level data corresponding to the user and each suggested professional contact; generate friction-reducing UI elements for each suggested professional contact based on the generated parameters; receive, via the professional networking UI, user input including a command to open a contact connection page corresponding to one of the suggested professional contacts; and cause surfacing of the contact connection page for the suggested professional contact on the display of the computing system, where the contact connection page includes at least a portion of the generated friction-reducing UI elements.

Example 11 includes the computer-readable storage medium of example 10, including or excluding optional features. In this example, the computer-executable instructions, when executed by the processor, cause the processor to utilize a machine learning model to perform at least one of the generation of the parameters or the generation of the friction-reducing UI elements.

Example 12 includes the computer-readable storage medium of example 11, including or excluding optional features. In this example, the computer-readable storage medium further includes computer-executable instructions that, when executed by the processor, cause the processor to: receive, via the professional networking UI, feedback regarding the contact connection page; and update the machine learning model based on the feedback.

Example 13 includes the computer-readable storage medium of any one of examples 10 to 12, including or excluding optional features. In this example, the parameters that are representative of the connection between the user and each suggested professional contact include at least one of: a location of the user; a location of the suggested professional contact; a current position of the user within the enterprise; a current position of the suggested professional contact within the enterprise; a career goal of the user; at least one of a goal or a standard corresponding to the enterprise; an estimated likelihood of reach-out success for the suggested professional contact; a relationship between the user and the suggested professional contact; any interactions between the user and the suggested professional contact; any similarities between the user and the suggested professional contact; or any mutual professional contacts between the user and the suggested professional contact.

Example 14 includes the computer-readable storage medium of any one of examples 10 to 13, including or excluding optional features. In this example, the friction-reducing UI elements include at least one of: an interactions panel that displays any interactions between the user and the suggested professional contact; an information panel that displays any similarities between the user and the suggested professional contact; an introductions panel that displays any mutual professional contacts between the user and the suggested professional contact; a notes box that enables the user to enter text regarding the suggested professional contact; a relationship drop-down menu that enables the user to specify a professional relationship between the user and the suggested professional contact; or a new event link that enables the user to schedule an introductory event with the suggested professional contact.

Example 15 includes the computer-readable storage medium of any one of examples 10 to 14, including or excluding optional features. In this example, the computer-readable storage medium further includes computer-executable instructions that, when executed by the processor, cause the processor to: receive, via the contact connection page, additional user input including an interaction with one of the friction-reducing UI elements; and perform an action corresponding to the selected friction-reducing UI element Example 16 includes the computer-readable storage medium of any one of examples 10 to 15, including or excluding optional features. In this example, the computer-readable storage medium further includes computer-executable instructions that, when executed by the processor, cause the processor to: integrate the parameters that are representative of the connection between the user and the suggested professional contact into a communication platform of the enterprise application; and, during a communication between the user and the suggested professional contact via the communication platform, cause surfacing of friction-reducing data corresponding to the parameters.

Example 17 is an application service provider server. The application service provider server includes: a processor; an enterprise application that is utilized by an enterprise; a communication connection for connecting a remote computing system to the application service provider server via a network, where the remote computing system is operated by a user associated with an enterprise; and a computer-readable storage medium operatively coupled to the processor. The computer-readable storage medium includes computer-executable instructions that, when executed by the processor, cause the processor to: execute, via the network, an enterprise application on the remote computing system; cause surfacing of a professional networking UI on a display of the remote computing system during the execution of the enterprise application, where the professional networking UI includes UI elements corresponding to a professional network of the user and suggested professional contacts for the user; generate parameters that are representative of a connection between the user and each suggested professional contact based on enterprise-level data corresponding to the user and each suggested professional contact; generate friction-reducing UI elements for each suggested professional contact based on the generated parameters; receive, via the professional networking UI, user input including a command to open a contact connection page corresponding to one of the suggested professional contacts; cause surfacing of the contact connection page for the suggested professional contact on the display of the remote computing system, where the contact connection page includes at least a portion of the generated friction-reducing UI elements; receive, via the contact connection page, additional user input including an interaction with one of the friction-reducing UI elements; and perform an action corresponding to the selected friction-reducing UI element.

Example 18 includes the application service provider server of example 17, including or excluding optional features. In this example, the computer-executable instructions, when executed by the processor, cause the processor to utilize a machine learning model to perform at least one of the generation of the parameters or the generation of the friction-reducing UI elements.

Example 19 includes the application service provider server of example 17 or 18, including or excluding optional features. In this example, the friction-reducing UI elements include at least one of: an interactions panel that displays any interactions between the user and the suggested professional contact; an information panel that displays any similarities between the user and the suggested professional contact; an introductions panel that displays any mutual professional contacts between the user and the suggested professional contact; a notes box that enables the user to enter text regarding the suggested professional contact; a relationship drop-down menu that enables the user to specify a professional relationship between the user and the suggested professional contact; or a new event link that enables the user to schedule an introductory event with the suggested professional contact.

Example 20 includes the application service provider server of any one of claims 17 to 19. In this example, the computer-readable storage medium further includes computer-executable instructions that, when executed by the processor, cause the processor to: integrate the parameters that are representative of the connection between the user and the suggested professional contact into a communication platform of the enterprise application; and, during a communication between the user and the suggested professional contact via the communication platform, cause surfacing of friction-reducing data corresponding to the parameters.

It should be noted that, while the methods and processes described herein are generally expressed in regard to discrete steps, these steps should be viewed as being logical in nature and may or may not correspond to any specific actual and/or discrete steps of a given implementation. In addition, the order in which these steps are presented in the various methods and processes, unless otherwise indicated, should not be construed as the only order in which the steps may be carried out. Moreover, in some instances, some of these steps may be combined and/or omitted. Those skilled in the art will recognize that the logical presentation of steps is sufficiently instructive to carry out aspects of the claimed subject matter irrespective of any particular development or coding language in which the logical instructions/steps are encoded.

Of course, while the methods and processes described herein include various novel features of the disclosed subject matter, other steps (not listed) may also be carried out in the execution of the subject matter set forth in these methods and processes. Those skilled in the art will appreciate that the logical steps of these methods and processes may be combined together or split into additional steps. Steps of the above-described methods and processes may be carried out in parallel or in series. Often, but not exclusively, the functionality of a particular method or process is embodied in software (e.g., applications, system services, libraries, and the like) that is executed on one or more processors of computing systems. Additionally, in various embodiments, all or some of the various methods and processes may also be embodied in executable hardware modules including, but not limited to, system on chips (SoC's), codecs, specially designed processors and/or logic circuits, and the like, on a computing system.

As suggested above, each method or process described herein is typically embodied within computer-executable instruction (or code) modules including individual routines, functions, looping structures, selectors, and switches (such as if-then and if-then-else statements), assignments, arithmetic computations, and the like, that, in execution, configure a computing system to operate in accordance with the particular method or process. However, as suggested above, the exact implementation in executable statement of each of the methods or processes is based on various implementation configurations and decisions, including programming languages, compilers, target processors, operating environments, and the linking or binding operation. Those skilled in the art will readily appreciate that the logical steps identified in these methods and processes may be implemented in any number of ways and, thus, the logical descriptions set forth above are sufficiently enabling to achieve similar results.

While various novel aspects of the disclosed subject matter have been described, it should be appreciated that these aspects are exemplary and should not be construed as limiting. Variations and alterations to the various aspects may be made without departing from the scope of the disclosed subject matter.

In particular and in regard to the various functions performed by the above described components, devices, circuits, systems and the like, the terms (including a reference to a "means") used to describe such components are intended to correspond, unless otherwise indicated, to any component which performs the specified function of the described component, e.g., a functional equivalent, even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and events of the various methods of the claimed subject matter.

There are multiple ways of implementing the claimed subject matter, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the claimed subject matter described herein may have aspects that are wholly in hardware, partly in hardware and partly in software, as well as in software.

The aforementioned systems have been described with respect to interactions between several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the claimed subject matter may have been disclosed with respect to one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A method for friction reduction during professional network expansion, wherein the method is implemented via a computing system comprising a processor, and wherein the method comprises:
    executing, via a network, an enterprise application on a remote computing system operated by a user associated with an enterprise;
    causing surfacing of a professional networking user interface (UI) on a display of the remote computing system during the execution of the enterprise application, wherein the professional networking UI comprises UI elements corresponding to a professional network of the user and suggested professional contacts for the user;
    generating parameters that are representative of a connection between the user and each suggested professional contact based on enterprise-level data corresponding to the user and each suggested professional contact, the enterprise-level data derived from at least one property graph, wherein the at least one property graph comprises at least:
        data objects relating to the user's interactions at the enterprise level,
        data objects relating to various types of enterprise resources, and
        data objects relating to telemetry data maintained by an application service provider of the enterprise application, the telemetry data comprising data collected during the execution of the enterprise application;
    generating friction-reducing UI elements for each suggested professional contact based on the generated parameters;
    receiving, via the professional networking UI, user input comprising a command to open a contact connection page corresponding to one of the suggested professional contacts; and
    causing surfacing of the contact connection page for the suggested professional contact on the display of the remote computing system, wherein the contact connection page comprises at least a portion of the generated friction-reducing UI elements.

2. The method of claim 1, comprising utilizing a machine learning model to perform at least one of the generation of the parameters or the generation of the friction-reducing UI elements.

3. The method of claim 2, comprising:
    receiving, via the professional networking UI, feedback regarding the contact connection page; and
    updating the machine learning model based on the feedback.

4. The method of claim 1, wherein the parameters that are representative of the connection between the user and each suggested professional contact comprise at least one of:
    a location of the user;
    a location of the suggested professional contact;
    a current position of the user within the enterprise;
    a current position of the suggested professional contact within the enterprise;
    a career goal of the user;
    at least one of a goal or a standard corresponding to the enterprise;
    an estimated likelihood of reach-out success for the suggested professional contact;
    a relationship between the user and the suggested professional contact;
    any interactions between the user and the suggested professional contact;
    any similarities between the user and the suggested professional contact; or
    any mutual professional contacts between the user and the suggested professional contact.

5. The method of claim 1, wherein the friction-reducing UI elements comprise at least one of:
    an interactions panel that displays any interactions between the user and the suggested professional contact;
    an information panel that displays any similarities between the user and the suggested professional contact;
    an introductions panel that displays any mutual professional contacts between the user and the suggested professional contact;
    a notes box that enables the user to enter text regarding the suggested professional contact;
    a relationship drop-down menu that enables the user to specify a professional relationship between the user and the suggested professional contact; or
    a new event link that enables the user to schedule an introductory event with the suggested professional contact.

6. The method of claim 1, further comprising:
    receiving, via the contact connection page, additional user input comprising an interaction with one of the friction-reducing UI elements; and
    performing an action corresponding to the selected friction-reducing UI element.

7. The method of claim 1, comprising:
    integrating the parameters that are representative of the connection between the user and the suggested professional contact into a communication platform of the enterprise application; and
    during a communication between the user and the suggested professional contact via the communication platform, causing surfacing of friction-reducing data corresponding to the parameters.

8. The method of claim 7, wherein causing the surfacing of the friction-reducing data corresponding to the parameters comprises pre-populating the communication platform with at least one of similarities between the user and the suggested professional contact, potential topics of mutual interest, potential meeting times, potential meeting locations, or potential communication methods.

9. The method of claim 1, comprising:
ranking a likelihood of professional network expansion between the user and each suggested professional contact based on the parameters that are representative of the connection between the user and each suggested professional contact;
generating a prioritized list of suggested professional contacts for the user based on the ranking; and
causing the surfacing of the prioritized list via the professional networking UI.

10. A computer-readable storage medium comprising computer-executable instructions that, when executed by a processor, cause the processor to:
execute an enterprise application on a computing system operated by a user associated with an enterprise;
cause surfacing of a professional networking user interface (UI) on a display of the computing system during the execution of the enterprise application, wherein the professional networking UI comprises UI elements corresponding to a professional network of the user and suggested professional contacts for the user;
generate parameters that are representative of a connection between the user and each suggested professional contact based on enterprise-level data corresponding to the user and each suggested professional contact, the enterprise-level data derived from at least one property graph, wherein the at least one property graph comprises at least:
data objects relating to the user's interactions at the enterprise level,
data objects relating to various types of enterprise resources, and
data objects relating to telemetry data maintained by an application service provider of the enterprise application, the telemetry data comprising data collected during the execution of the enterprise application;
generate friction-reducing UI elements for each suggested professional contact based on the generated parameters;
receive, via the professional networking UI, user input comprising a command to open a contact connection page corresponding to one of the suggested professional contacts; and
cause surfacing of the contact connection page for the suggested professional contact on the display of the computing system, wherein the contact connection page comprises at least a portion of the generated friction-reducing UI elements.

11. The computer-readable storage medium of claim 10, wherein the computer-executable instructions, when executed by the processor, cause the processor to utilize a machine learning model to perform at least one of the generation of the parameters or the generation of the friction-reducing UI elements.

12. The computer-readable storage medium of claim 11, further comprising computer-executable instructions that, when executed by the processor, cause the processor to:
receive, via the professional networking UI, feedback regarding the contact connection page; and update the machine learning model based on the feedback.

13. The computer-readable storage medium of claim 10, wherein the parameters that are representative of the connection between the user and each suggested professional contact comprise at least one of:
a location of the user;
a location of the suggested professional contact;
a current position of the user within the enterprise;
a current position of the suggested professional contact within the enterprise;
a career goal of the user;
at least one of a goal or a standard corresponding to the enterprise;
an estimated likelihood of reach-out success for the suggested professional contact;
a relationship between the user and the suggested professional contact;
any interactions between the user and the suggested professional contact;
any similarities between the user and the suggested professional contact; or
any mutual professional contacts between the user and the suggested professional contact.

14. The computer-readable storage medium of claim 10, wherein the friction-reducing UI elements comprise at least one of:
an interactions panel that displays any interactions between the user and the suggested professional contact;
an information panel that displays any similarities between the user and the suggested professional contact;
an introductions panel that displays any mutual professional contacts between the user and the suggested professional contact;
a notes box that enables the user to enter text regarding the suggested professional contact;
a relationship drop-down menu that enables the user to specify a professional relationship between the user and the suggested professional contact; or
a new event link that enables the user to schedule an introductory event with the suggested professional contact.

15. The computer-readable storage medium of claim 10, further comprising computer-executable instructions that, when executed by the processor, cause the processor to:
receive, via the contact connection page, additional user input comprising an interaction with one of the friction-reducing UI elements; and
perform an action corresponding to the selected friction-reducing UI element.

16. The computer-readable storage medium of claim 10, further comprising computer-executable instructions that, when executed by the processor, cause the processor to:
integrate the parameters that are representative of the connection between the user and the suggested professional contact into a communication platform of the enterprise application; and during a communication between the user and the suggested professional contact via the communication platform, cause surfacing of friction-reducing data corresponding to the parameters.

17. An application service provider server, comprising:
a processor;
an enterprise application that is utilized by an enterprise;
a communication connection for connecting a remote computing system to the application service provider server via a network, wherein the remote computing system is operated by a user associated with an enterprise; and
a computer-readable storage medium operatively coupled to the processor, the computer-readable storage medium comprising computer-executable instructions that, when executed by the processor, cause the processor to:

execute, via the network, an enterprise application on the remote computing system;

cause surfacing of a professional networking user interface (UI) on a display of the remote computing system during the execution of the enterprise application, wherein the professional networking UI comprises UI elements corresponding to a professional network of the user and suggested professional contacts for the user;

generate parameters that are representative of a connection between the user and each suggested professional contact based on enterprise-level data corresponding to the user and each suggested professional contact, the enterprise-level data derived from at least one property graph, wherein the at least one property graph comprises at least:
  data objects relating to the user's interactions at the enterprise level,
  data objects relating to various types of enterprise resources, and
  data objects relating to telemetry data maintained by an application service provider of the enterprise application, the telemetry data comprising data collected during the execution of the enterprise application;

generate friction-reducing UI elements for each suggested professional contact based on the generated parameters;

receive, via the professional networking UI, user input comprising a command to open a contact connection page corresponding to one of the suggested professional contacts;

cause surfacing of the contact connection page for the suggested professional contact on the display of the remote computing system, wherein the contact connection page comprises at least a portion of the generated friction-reducing UI elements;

receive, via the contact connection page, additional user input comprising an interaction with one of the friction-reducing UI elements; and perform an action corresponding to the selected friction-reducing UI element.

18. The application service provider server of claim 17, wherein the computer-executable instructions, when executed by the processor, cause the processor to utilize a machine learning model to perform at least one of the generation of the parameters or the generation of the friction-reducing UI elements.

19. The application service provider server of claim 17, wherein the friction-reducing UI elements comprise at least one of:
  an interactions panel that displays any interactions between the user and the suggested professional contact;
  an information panel that displays any similarities between the user and the suggested professional contact;
  an introductions panel that displays any mutual professional contacts between the user and the suggested professional contact;
  a notes box that enables the user to enter text regarding the suggested professional contact;
  a relationship drop-down menu that enables the user to specify a professional relationship between the user and the suggested professional contact; or
  a new event link that enables the user to schedule an introductory event with the suggested professional contact.

20. The application service provider server of claim 17, wherein the computer-readable storage medium further comprises computer-executable instructions that, when executed by the processor, cause the processor to:
  integrate the parameters that are representative of the connection between the user and the suggested professional contact into a communication platform of the enterprise application; and
  during a communication between the user and the suggested professional contact via the communication platform, cause surfacing of friction-reducing data corresponding to the parameters.

* * * * *